US012645984B2

(12) United States Patent
Roy

(10) Patent No.: US 12,645,984 B2
(45) Date of Patent: Jun. 2, 2026

(54) MAKING AN ENABLED CAPABILITY

(71) Applicant: The Government of the United States, as represented by the Secretary of the Army, Washington, DC (US)

(72) Inventor: Radhika Roy, Howell, NJ (US)

(73) Assignee: The Government of the United States, represented by the Secretary of the Army, Washington, DC (US)

( * ) Notice: Subject to any disclaimer, the term of this patent is extended or adjusted under 35 U.S.C. 154(b) by 1326 days.

(21) Appl. No.: 17/402,683

(22) Filed: Aug. 16, 2021

(65) Prior Publication Data

US 2023/0049550 A1     Feb. 16, 2023

(51) Int. Cl.
*G06N 20/00* (2019.01)
*G06F 18/213* (2023.01)
*G06F 18/214* (2023.01)

(52) U.S. Cl.
CPC ........... *G06N 20/00* (2019.01); *G06F 18/213* (2023.01); *G06F 18/214* (2023.01); *G06F 2218/04* (2023.01); *G06F 2218/08* (2023.01)

(58) Field of Classification Search
CPC ..... G06N 20/00; G06F 18/214; G06F 18/213; G06F 2218/04; G06F 2218/08
See application file for complete search history.

(56) References Cited

U.S. PATENT DOCUMENTS

| | | | | |
|---|---|---|---|---|
| 12,314,828 B2 * | 5/2025 | Bondugula | ............ | G06N 5/022 |
| 2021/0236044 A1 * | 8/2021 | Arroyo-Gallego | .... | A61B 5/112 |
| 2024/0321447 A1 * | 9/2024 | Selvaraj | ................. | G16H 50/70 |

* cited by examiner

*Primary Examiner* — David E Choi
(74) *Attorney, Agent, or Firm* — Ronald Krosky

(57) ABSTRACT

Various embodiments relate to network capabilities. Devices of a network can have different capabilities. The network can provide artificial intelligence (AI) enabled, machine learning (ML) enabled, deep learning (DL) enabled networked access to these capabilities. The capabilities can share a common AI/ML/DL-enabled open layer-based net-centric logical protocol architecture. Also, different features can be achieved through different layers. As an example, AI enabled access can be achieved through the application layer, ML enabled access and DL enabled access can be achieved through the presentation layer and the session layer, and network access is achieved through the transport layer, the network layer, the link layer, and the physical layer.

16 Claims, 10 Drawing Sheets

100

| OSI Layer 7: Application Layer |
| OSI Layer 6: Presentation Layer |
| OSI Layer 5: Session Layer |
| OSI Layer 4: Transport Layer |
| OSI Layer 3: Network Layer |
| OSL Layer 2: Link Layer |
| OSI Layer 1: Physical Layer |

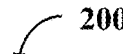

| | |
|---|---|
| AI/ML/DL-ENABLED APPLICATION SERVICE LAYER (OSI LAYER 1) | AI/EXPANDABLE AI (XAI)-AWARE APPLICATION SERVICES (E.G., CYBERSECURITY, OPERATIONS AND MANAGEMENT ()&m), NATRUAL LANGUAGE SPEECH, ANALYTICS/PREDICTION/FORECAST, EXPERT SYSTEM VISION, ROBOTICS, MOOD GUESSING, SENTIMENT ANALYSIS, ETC. |
| COMMON AI/ML/DL-ENABLED APPLICATION LAYER (OSI LAYER 2) | AI APPLICATIONS THAT ARE ML/DL-BASED (E.G., NATURAL LANGUAGE PROCESSING (NLP) PLATFORM (E.G., CONTENT EXTRACTION/CLASSIFICATION/MACHINE TRANSFORMATION/QUESTION ANSWERING/TEST CORRELATION), EXPERT SYSTEM PLATFORM, KNOWLEDGE BASE (KB), ONTOLOGY, VISION PLATFORM (IMAGE PROCESSING/MACHINE VISION), SPEECH PLATFORM (TEXT-TO-SPEECH/SPEECH-TO-TEXT), ROBOTICS PLATFORM, ETC.) AND XAI APPLICATIONS (E.G., CASUAL INFERENCE WITH REFLECITON-BASED ML/DL-BASED). |
| COMMON AI/ML/DL-ENABLED MIDDLEWARE PROTOCOL LAYER (OSI LAYER 3) | ML/DL NETWORK PLATFORMS, SUPERVISED/UNSUPERVISED/REINFORCEMENT LEARNING AND ALGORITHMS THAT INCLUDE A TRAINING PHASE (E.G., FEATURE EXTRACTION AND TRAINING OUTPUTS), DETECTION PHASE (E.G., FEATURE EXTRACTION AND CLASSIFIER), AND DECISION PHASE (E.G., EVALUATION)<br><br>EXAMPLE ML/DL ALGORITHMS CAN INCLUDE LINEAR REGRESSION, LOGISTICS REGRESSION, LINEAR DISCRIMINANT ANALYSIS (LDA), GRADIENT BOOSTED DECISION TREE (E.G., XGBOOST), FACTORIZATION MACHINE (FM), K-MEANS, CLUSTERING, EXPECTATION MAXIMUM (EM) CLUSTERING, RANDOM FOREST, NAÏVE BAYES, PRINCIPAL COMPONET ANALYSIS (PCA), LINEAR LEARNER, SUPPORT VECTOR MACHINES (SVM), LONG SHORT TERM MEMORY (LSTM), BELIFE NETWORK, HIDDEN MARKOVE MODEL (HMM), PROFILE HIDDEN MARKOV MODEL (PHMM), RECURRENT NEURAL NETWORK (RNN), CONVOLUTIONAL NEURAL NETWORK (CNN), NEURAL TUNING MACHINE (NTM), FUZZY SYSTEMS, ETC.)<br><br>EXAMPLE ML/DL MODEL COMPEONTNS CAN INCLDUE MATHEMATICAL MODELS, NEURAL NETWORK ARCHITECTURE, TENSORS, HYPER-PARAMETERS, DECISION TREES, ETC.<br><br>EXAMPLE ML/DL TOOLS/LIBRARIES/LANGUAGES CAN INCLUDE TENSOR-FLOW, KERAS, H2O, OPENNN, SPARKS-MLIB, TORCH-PYTORCH, CAFFE, GLUON, ETC.<br><br>CASULA INTERFACE WITH REFLECTION(CI-R)-BASED ML/DL – NEURAL NETWORK PLATFORM SUPERVISED/UNSUPERVISED/REINFORCEMENT LEARNING AND ALGORITHMS |
| COMMON AI/ML/DL-ENABLED TRANSPORT LAYER (OSI LAYER 4) | TRANSPORT PROTOCOL (E.G., TLS/TCP) |
| COMMON AI/ML/DL-ENABLED NETWORK LAYER (OSI LAYER 5) | NETERNET PROTOCOL (IP)/ROUTING PROTOCOL<br><br>THIS CAN INCLUDE LOGICAL DHT/NON-DHT ROUTING PROTOCOLS OVER MANETs/DILs OR DTNs AS WELL AS PHYSICAL ROUTING PROTOCOLS (E.G., OSPFv3-MDR, OSPFv3-CRD, DSR, OLSR, OSPFv3 BGP, ETC.) |
| COMMON AI/DL/ML-ENABLED LINK/MAC LAYER (OSI LAYER 6) | MEDIA ACCESS CONTROL (MAC) PROTOCOL (E.G., CDMA, TDMA, FDMA, HYBRID OF CDMA/TDMA/FDMA, OFDMA, CSMA/CA, CSMA/CD, ETC.) |
| COMMON AI/ML/DL-ENABLED PHYSICAL LAYER (OSI LAYER 7) | PHYSICAL LAYER (E.G., WIRELESS, FIBER, WIRELINE, ETC.) |

FIG. 2

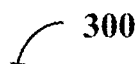
300
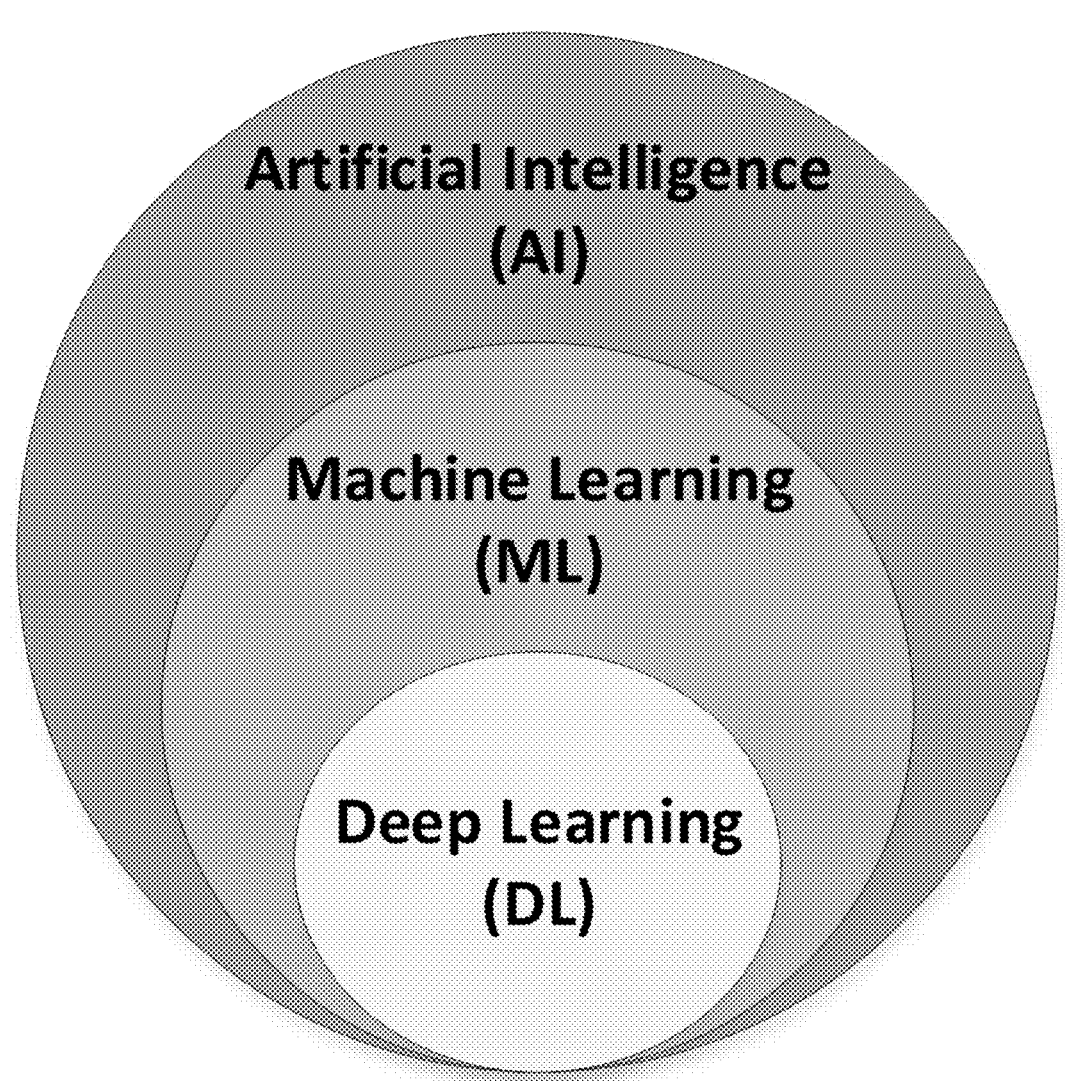
FIG. 3

900

OBTAIN UNCLEARED DATA SET    910

CLEAR UNCLEARED DATA SET    920

PERFORM FEATURE EXTRACTION UPON CLEARED DATA SET TO PRODUCE FEATURE SET    930

PERFORM FEATURE CLASSIFICAITON UPON FEATURE SET TO PRODUCE CLASSIFIED FEATURE SET    940

CAUSE OUTPUT OF CLASSIFIED FEATURE SET    950

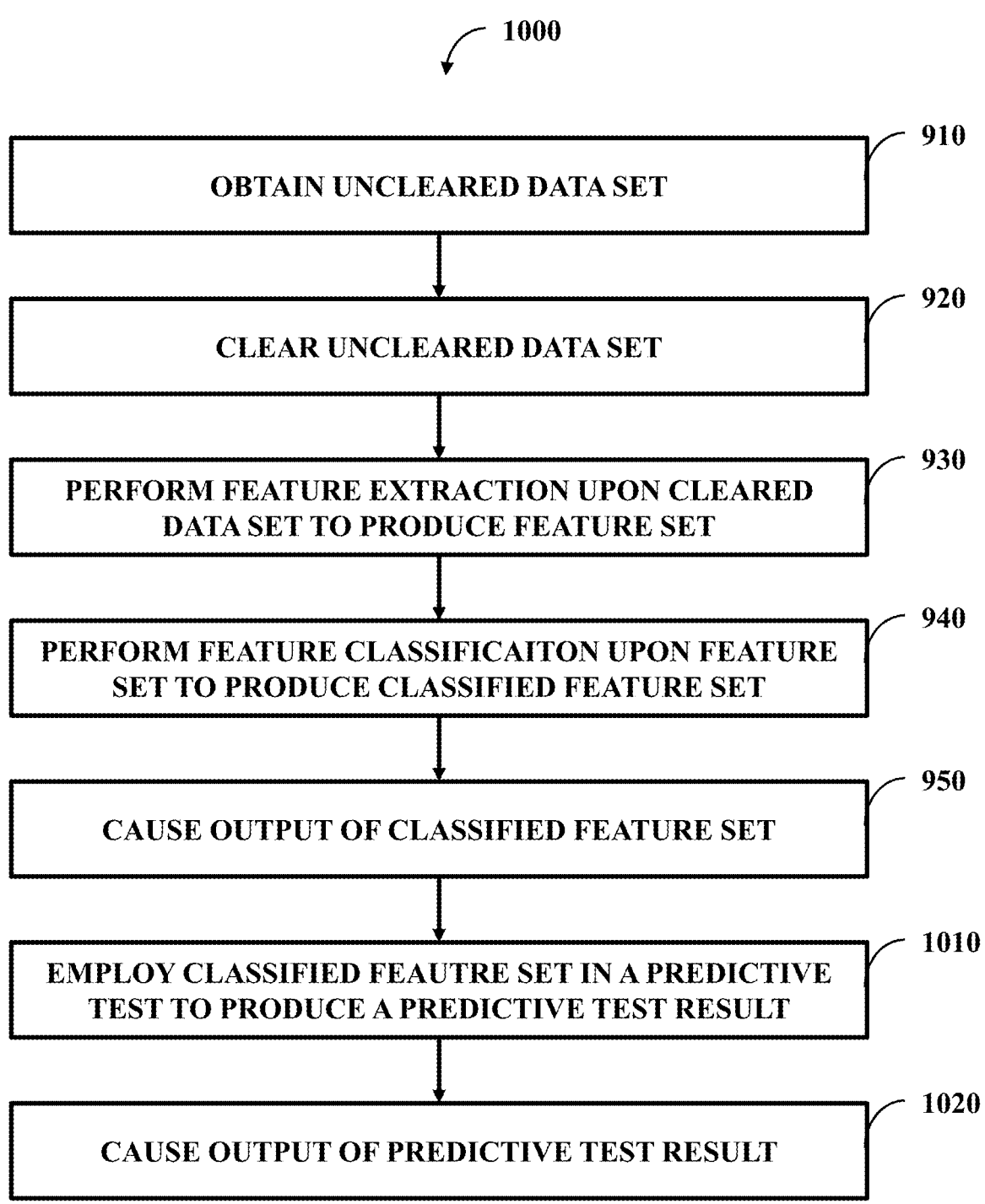

1000

OBTAIN UNCLEARED DATA SET — 910

CLEAR UNCLEARED DATA SET — 920

PERFORM FEATURE EXTRACTION UPON CLEARED DATA SET TO PRODUCE FEATURE SET — 930

PERFORM FEATURE CLASSIFICAITON UPON FEATURE SET TO PRODUCE CLASSIFIED FEATURE SET — 940

CAUSE OUTPUT OF CLASSIFIED FEATURE SET — 950

EMPLOY CLASSIFIED FEAUTRE SET IN A PREDICTIVE TEST TO PRODUCE A PREDICTIVE TEST RESULT — 1010

CAUSE OUTPUT OF PREDICTIVE TEST RESULT — 1020

FIG. 10

MAKING AN ENABLED CAPABILITY

GOVERNMENT INTEREST

The innovation described herein may be manufactured, used, imported, sold, and licensed by or for the Government of the United States of America without the payment of any royalty thereon or therefor.

BACKGROUND

A basic electronic device can have relatively limited functionality. This limited functionality can limit the overall usefulness of the device. In view of this, devices have become more complicated. This increase in complexity can lead to greater functionality of devices and devices being used in ways not used before.

As an example, a cellular telephone had limited functionality to simply make telephone calls. Over time, the cellular telephone added further functionality, such as the ability to send text messages. This further evolved into the modern day smartphone. As this complexity increases, the functionality can benefit from improved management.

SUMMARY

In one embodiment, a system, implemented at least in part by way of non-software, can comprise an identification component and an enablement component. The identification component can be configured to identify a capability of a device. The enablement component can be configured to cause the capability to be artificial intelligence (AI)-enabled, machine learning (ML)-enabled, deep learning-(DL) enabled, and network-enabled.

In another embodiment, a method comprises obtaining an uncleared data set. The method can additionally comprise clearing the uncleared data set to produce a cleared data set. The method can also comprise performing feature extraction upon the cleared data set to produce a feature set and performing feature classification upon the feature set to produce a classified feature set. In addition, the method can comprise causing output of the classified feature set.

In yet another embodiment, an artificial intelligence (AI)-enabled, machine learning (ML)-enabled, deep learning (DL)-enabled modem is part of a network with a second modem. The AI, ML, and DL-enabled modem can comprise a modulator component and demodulator component.

The modulator component can be configured to modulate a non-channel received signal for communication across a channel that links the modem with the second modem such that a modulated signal is produced. The demodulator component can be configured to demodulate a channel received signal for communication out of the modem, the channel received signal being received from the second modem such that a demodulated signal is produced.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIG. 2 illustrates one embodiment of a common Artificial Intelligence (AI)/Machine Learning (ML)/Deep Learning (DL)-enabled OSI Layer-based Net-Centric Logical Protocol Architecture;

FIG. 3 illustrates one embodiment of a relationship between AI, ML, and DL;

FIG. 10 illustrates one embodiment of a method comprising seven actions.

DETAILED DESCRIPTION

Figure 1:
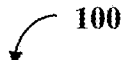
FIG. 1 illustrates one embodiment of a logical layer stack, such as an Open Standard International (OSI) logical layer stack.

Networked devices like phones or other functional entities such as servers and databases play an important role in everyday life. A device, server, or database can have many capabilities such as audio, video, software, hardware, storage, processor, operating system (OS), virtual machine, and others. In terms of communications technology, these capabilities can be partitioned into seven logical layers in accordance to open standard international (OSI). When a device, server, or database is connected to a network, capabilities residing in different layers can be shared between these devices, servers, and/or databases connected over the network as desired. A capability termed as artificial intelligence (AI) can be implemented using software codes can be employed. AI can include the simulation of human intelligence in machines that includes computer processors, which are programmed to think like humans and mimic their actions. Individual capabilities of a device, server, or database can be enhanced by superimposing an AI capability. For example, a device when superimposed with AI capabilities can act like robot that may be a stand-alone device or networked. An AI-enabled robot can perform works autonomously under commands. In another example, a robot is superimposed with another kind of AI capabilities and can also perform learning, reasoning and self-correction. This can be similar for other devices or entities. In another example, the network can retain software codes of AI capabilities as storage in a database connected to a server of the network. This database/server can be a centralized database/server or a distributed database/server. When the device or any other entity connects to the network, the device or entity can augment its capabilities with the help of AI software codes from the database/server of the network to make it AI-enabled. On the other hand, the AI-enabled device/entity connected in the network can communicate with other AI-enabled devices/entities in the network for collaboration and other purposes.

As devices become more complex, these devices have more AI capabilities. Logically, a device's capabilities can fit into seven OSI logical layers from communications software and hardware perspective. The capabilities of an individual OSI layer can be AI-enabled. This leads to unique challenges in making the individual capability of OSI layer AI-enabled. One way of implementation is to have AI software codes dedicated for the individual OSI layer for making it AI-enabled. Another alternative is to have a common memory space of the device for sharing AI software codes for the seven logical OSI layers to make each capability of the OSI layer of the device internally AI-enabled. In another example, a database connected to a server can have a repository of AI software codes in the network. If there are servers having application capabilities such as command and control applications, cyber security applications, directory service, and others connected in the network, then those respective application servers can be made AI-enabled taking advantage of the common repository of AI software codes of the database/server connected over the network without having them in the memory of the application servers. In this, we can have AI-enabled command and control applications, AI-enabled cyber security applications, AI-enabled directory service, and AI-enabled other capabilities. Note that the term AI that is used for simplicity and, in fact, it comprises (AI), machine learning (ML), and deep learning (DL). We use the term "AI" means "AI/ML/DL." AI-enabled means actually it is AI/ML/DL-enabled. When a device or a server is connected to a network can take advantage of the common repository of the AI software codes of the centralized or distributed database/server connected to the network to make it AI-enabled. In this way, the device or server connected to the network does not need to be equipped with AI software codes individually, thereby, providing economies-of-scale having scalability.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

"Maximum", "Optimize", "Best", and similarly extremist terms, as used herein, are for example purposes an intended to include an improvement that does not reach a maximum or optimized level (e.g., optimizing would cover the ideal solution and the next to ideal solution that is slightly inferior to the ideal solution).

FIG. 1 illustrates one embodiment of a logical layer stack 100, such as an Open Standard International (OSI) logical layer stack that can be employed with regard to artificial intelligence (AI). Application of AI can shape theories and techniques for making AI-enabled products and communications networking services, including cybersecurity. However, the multidisciplinary and fast-growing features make AI a field difficult in how capabilities are AI-enabled and networked using a common infrastructure. Even without fully developed AI standards, products can be developed and used for services almost in all disciplines.

In view of this, a common net-centric architecture can make each and every capability including cybersecurity AI/machine learning (ML)/deep learning (DL)-enabled and networked (e.g., network-enabled). To achieve this, the OSI Layers protocol architecture can be employed for developing of AI/ML/DL common infrastructure. Capabilities of communications networking can be grouped into seven OSI Logical Layers in separating software and hardware capabilities. An individual OSI Layer can have many capabilities. The proposed infrastructure will not only provide scalability for sharing the same common AI/ML/DL platform resources, but will also provide a level of interoperability using the application programming interface (API) even using proprietary products in multi-vendor environments. On the other hand, the same common AI/ML/DL infrastructure can be used for a non-networked stand-alone single device, such as a robot, for making an individual capability of a logical OSI layer (e.g., each capability at each layer) AI/ML/DL enabled without duplicating the similar or same AI/ML/DL capabilities of different layers. For example, capabilities in each OSI layer even for single non-networked device can use software and hardware from many different vendors. In this situation, this common AI/ML/DL infrastructure can be used for various OSI layers providing economies of scale and interoperability using APIs.

The application layer (OSI Layer 7) can be where service (or application) capabilities reside where the capabilities of presentation (OSI Layer 6) and (OSI Layer 5) are used to assist for creation of services of the application layer (OSI Layer 7). However, the capabilities of the transport-(OSI Layer 4), network- (OSI Layer 3), link-(OSI Layer 2), and physical-layer (OSI Layer 1) can be used to make the applications networked. In other words, the application layer (OSI Layer 7) uses the services (or capabilities) of lower layers (OSI Layers 1 through 7).

The capabilities of applications (OSI Layer 7) could be so huge that we can consider limitless as time goes by. A group of capability sets can be taken where an individual group of capability can comprise multiple capabilities. The group of capability sets along with their sub-capability sets can vary.

In one example, the capability set can pertain to autonomous platforms, such as autonomous ground and air vehicles, (e.g., that operate in open, urban and cluttered environments, including robotics). Example capabilities can include:

An ability to move in very cluttered, irregular, urban and underground terrains;

An ability to move effectively in contested environments and survive attacks;

Technologies to enable low electronic and physical profiles;

Architectures to enable reprogrammable platforms under dynamic conditions;

Sensors to detect obscured targets and to characterize terrain obstacles;

Autonomous ground and air structures, propulsion, and mobility components; and

Technologies to significantly reduce logistical burdens

In one example, the capability set can pertain to AI/ML capabilities that can reduce the cognitive burden on humans and improve overall performance through human-machine teaming. AI/ML research. Example capabilities can include:

Autonomous, intelligent maneuver and behaviors of autonomous ground and air vehicles —object recognition, threat warning, etc.;

An ability to analyze large, diverse data sets to predict enemy intent and behaviors;

Technologies to ensure robust, resilient and intelligent networking, cyber, electronic warfare and analysis of adversary signals;

Data analysis capabilities to engage with and exploit classified and unclassified sources in order to produce enhanced intelligence products; and Techniques to fuse data from disparate sources to improve a particular mission;

In one example, the capability set can pertain to data visualization and synthetic environments. These can be capabilities that enable improved situational awareness, enable improved visualization and navigation of large data sets, and that enhances operational activities and training and readiness. Example capabilities can include:

Processing sensor data and large data sets;

Processing complex multi-source mode data sets;

Practicing visualization and synthetic environment approaches to enable improved training; and Practicing synthetic environments and networked instrumentation approaches for virtual-live validation of concepts and prototypes.

In one example, the capability set can pertain to Assured Position, Navigation, and Timing (PNT). These can be key enablers for different capabilities including autonomous vehicles, communications, and land navigation. These can be solutions that enable robust PNT for vehicles, soldiers, munitions, and so on. Example capabilities can include:

Practicing PNT technologies which operate reliably in GPS-degraded or denied areas which cannot be exploited by adversaries;

Producing enhancements to commercial technologies to enable them to meet Army needs;

Implementing PNT-enabled guidance and control; and

Employing algorithms and techniques to fuse data from multiple PNT sources to provide robust capabilities.

In one example, the capability set can include sensing to provide a detailed understanding of the environments and activities in the areas where the sensor operates. Example capabilities can include:

Detecting people, equipment, weapons, and any other object or action of interest;

Detecting targets even when obscured; and

Detecting based upon, physical, behavioral, cyber, or other signatures.

In one example, the capability set can include communications & networks enablement. It can be critical that communication channels & networks maintain secure, reliable communications for soldiers, vehicles and at fixed locations even in austere environments. Example capabilities can include:

Enabling robust, secure networks;

Achieving network interoperability; and

Producing high efficiency components.

In one example, the capability set can include computational capabilities. This can include high performance computational capabilities to exploit large data sets and to compute complex AI/ML algorithms for applications. Example capabilities can include Edge computing;

Throughput computing; and

Power efficiency computing.

In one example, the capability set can include Internet of Things (IoT) capabilities. These can include performance upon an IoT networking system that integrates a wide range of capabilities and equipment to capitalize on commercial developments in the industrial and human IoT. This can help manage dynamic usable communication bandwidth and as such use of automated reallocation of communication resources and information sharing strategies. Example capabilities can include:

Employing quantitative models and technical approaches enabling automated management of IoT;

Employing ML techniques that accelerate decision making to address the scale/volume of IoT information; and Developing and applying algorithms and methods to enable secure, resilient, and automatically managed IoT networks in highly complex, mixed cooperative/adversarial, information-centric environments In one example, the capability set can include protection capabilities. Communication channels & networks face a number of threats to be addressed. Example capabilities can include:

Processing sensor data to detect chemical, biological, radiological, nuclear, and explosive threats;

Employing cyber protection technologies, methodologies, and concepts to protect systems including platforms and networks; and Evaluating human performance optimization to endure harsh and extenuating conditions;

In one example, the capability set can include Human Performance—The Soldier is the foundation of all Army capabilities. Technologies that reduce Soldiers' mental or physical burden and allow them to react faster than their adversaries are needed in the following areas: Example capabilities can include:

Human-machine interaction processing to insure autonomous platforms are efficiently managed and exploited and Methodologies and approaches for effective augmentation of people in areas of cognition, perception, and physical performance.

In one example, the capability set can include underpinning methodologies. This can include methodologies, frameworks, tools, facilities, techniques, and experimentation concepts, which underpin and enable advanced research and development. Example capabilities can include:

Collecting, standardizing, transforming, and maintaining data to focus research and validate concepts;

Rapid modeling, development, and assessment of technologies across widely distributed research areas;

Integrating innovative technology applications into different systems, applications, and analysis constructs to assess the potential operational effectiveness of technology elements; and Automating data analytics to enhance discovery, development and transition management of technologies.

Practicing aspects disclosed herein can create an AI/ML/DL Communications Networking Architecture including Cybersecurity making the above capability areas, along with others, AI/ML/DL-enabled and Networked: Autonomous platforms, AI/ML, Data visualization and synthetic environments, Assured Position, PNT, Sensing, Communications & networks, Computation, IoT, Protection, Human Performance, and Underpinning Methodologies. Aspects disclosed herein facilitate the development of an AI/ML/DL communication networking infrastructure architecture including Cybersecurity which could be used as a basis for designing networks making capabilities AI/ML/DL-enabled and networked. This can provide scalability for using the same AI/ML/DL communication networking infrastructure even using proprietary products from different vendors, and thereby economies-of-scale though sharing the same common resources. The same AI/ML/DL communications networking infrastructure can be used for "horizontal capabilities" starting from OSI physical layers 1 through 7 as well as for all "vertical capabilities" from ground-tier, aerial-tier, air-tier, space-tier, and under-sea-tier in Multi-Domain Operations (MDO) in a Lower Tactical Network and an Upper Tactical Network.

FIG. 2 illustrates one embodiment of a common AI/ML/DL-enabled OSI Layer-based Net-Centric Logical Protocol Architecture 200 that can work in conjunction with an end-to-end communications protocol(s) networking architecture. The network (e.g., access and backbone router functional entity) can be primarily concerned with up to OSI Layer 3 (in some cases it may go up to OSI Layer 4) while the terminal or the server functional entity at the edges can be responsible in dealing with all OSI Layers (Layers 1 through 7). In one example, AI Applications that reside in the OSI application layer can comprise a Natural Language Processing (NLP) Platform (e.g., Content Extraction/Classification/Machine Transformation/Questions Answering/Test Correlation), Expert System Platform, Knowledge Base (KB), Ontology, Vision Platform (e.g., Image Processing/Machine Vision), Speech Platform (e.g., Text-To-Speech/Speech-To-Text), Robotics Platform, Explainable Artificial Intelligence (XAI), and other Platforms.

In one example, the ML algorithms/models that reside in SOI layers can comprise Rocchio Classification, Boosting and Bagging (e.g., Boosting and/or Bagging), Logistic Regression (e.g., Combining Instance-Based Learning and Logistic Regression and/or Multinomial Logistic Regression), Naïve Bayes Classifier (e.g., High-Level Description of Naïve Bayes Classifier, Multinomial Naïve Bayes Classifier, and/or Naïve Bayes Classifier for Unbalanced Classes), K-Nearest Neighbor (e.g., Weight Adjusted K-Nearest Neighbor Classification), Support Vector Machine (e.g., Binary-Class, Multi-Class, String Kernel, Stacking, and/or Multiple Instant Learning (MIL)), Design Tree, Random Forest (e.g., Voting), and/or Conditional Random Field (CRF). In one example, the DL algorithms/models that reside in SOI layers can comprise Deep Neural Networks, Recurrent Neural Networks (e.g., Long Short- Term Memory and/or Gated Recurrent Unit), Conventional Neural Networks, Deep Belief Network, Hierarchical Attention Networks, Semi-Supervised Learning for Text Classification and/or Combination Techniques (e.g., Random Multi-model Deep Learning, Stochastic Gradient Descent Optimizer, RMSProp Optimizer, Adam Optimizer, Adagrad Optimizer, Adadelta Optimizer, Hierarchical Deep Learning for Text, Recurrent convolutional neural networks, and/or Conventional Neural Networks with Long Short-Term Memory). In addition, there can be many ML/DL tools such as Tensor-Flow, Keras, H2O, OpenNN, Spark-Mlib, Torch-PyTorch, Caffe, Gluon, Causal Inference with Reflection-based ML/DL, and others.

The network (e.g., access and backbone router functional entity) can be primarily concerned with up to OSI Layer 3 (in some cases it may go up to OSI Layer 4) while the terminal or the server functional entity at the edges can be responsible in dealing with all OSI Layers (Layers 1 through 7). The AI applications (OSI Layer 7) and the Machine/Deep Learning (ML/DL) platforms (OSI Layers 5-6) can form a common AI/ML/DL communication networking infrastructure for making the different capabilities of each OSI Layer AI/ML/DL-enabled and networked. These AI/ML/DL technologies can be software-based (e.g., software retained in hardware). For example, if a cybersecurity application is to be AI-enabled, then one or multiple AI applications that are invoked by the cybersecurity application can work in synch to invoke ML/DL algorithm(s) as appropriate to make AI/ML/DL-enabled application. In turn, ML/DL algorithm(s) tune their parameters (or features) in accordance to the requirements of the cybersecurity application. As an example, applications or services residing in the application layer can be AI/ML/DL-enabled using a common AI/ML/DL infrastructure residing in the memory of a computer (e.g., a computer that comprises the system 800 of FIG. 8 below). In case of network-based devices, applications or services, those capabilities that are residing in the OSI Layers (Layers 1 through 7) can be made AI/ML/DL-enabled accessing the common AI/ML/DL infrastructure that is residing in the database/server connected to the network. For the AI/ML/DL common infrastructure, AI applications can reside in application layer (Layer 7) while the ML/DL algorithms/models reside can reside in Layers 6 and 5. Capabilities residing in layers 1 to 4 that make a device, application, or service networked can also be augmented using the same common AI/ML/DL infrastructure residing in database/server connected to the network. In general, OSI layers 3, 2, 1 (in some cases Layer 4) can make a device, service, or application networked.

Similarly, if a different application is to be AI/ML/DL-enabled, the same procedures can be invoked by AI/ML/DL functional entities choosing the same or different AI application(s) and ML/DL algorithm(s) and tuning their (algorithms') parameters (features) of the application to make that particular application AI/ML/DL-enabled, and so on.

The lower OSI layers can be invoked to make the AI/ML/DL-enabled cybersecurity application networked or network-enabled. It may not be necessary that each lower OSI Layer (Layer 1, 2, 3, or 4) needs to be AI/ML/DL-enabled for making the AI/ML/D1-enabled cybersecurity application networked or network-enabled.

If the lower OSI Layers are AI/ML/DL-enabled, the performances of those layers can become almost near to normal. For instance, if a physical layer channel becomes AI/ML/DL-enabled, the channel capacity might approach to maximum ideal Shannon throughput capacity bound. This can also apply to OSI Layers 2 (MAC/Link), 3 (Network/

Routing), and 4 (Transport). The overall end-to-end network throughput capacity can increase dramatically nearer to normal/ideal if those OSI Layers 1 through 4 are AI/ML/ DL-enabled. In one example, the same common set of AI applications (Layer 7) and ML/DL algorithms (Layers 5-6) platforms (FIG. 6) can be invoked by each OSI Layer (that is, 1, 2, 3, or 4) as appropriate tuning the parameters (features) of each OSI Layer, respectively.

AI applications and ML/DL Middleware Platforms (FIGS. 4 and 6) can be software-based and can be kept in the repository/memory to invoke them as appropriate depending on the requirements of the capability (e.g., signal modulation, electronic warfare (EW), signal processing, radar, MAC protocol, network routing, transport protocol, middleware protocol, position/navigation/timing (PNT), multi-dimensional sensor, big data analysis/data science, cybersecurity, command & control, operation & management, autonomous system and control, or flight routing) that is to be AI/ML/D1-enabled and networked.

For a given particular capability, a component can choose an appropriate AI/ML/DL vendor product and can synthetize in the light of the above. The Common Set of AI Applications and ML/DL Middleware Platforms can make vendor product(s) AI/ML/D1-enabled and networked even if these products are proprietary.

FIG. 3 illustrates one embodiment of a relationship 300 between AI, ML, and DL. AI can be considered a kind of agent-based allocations that uses ML and/or DL algorithms to automate (e.g., self-service of the agent) services of application(s) with enhanced productivity/efficiency and reliability.

Data can be inputted to algorithms, which is aggregated in a certain relevant context (e.g. classification like modulations, channel access protocols, routing protocols, transport protocols, messaging protocols, audio/video coding, text, audio conferencing, videoconferencing, cybersecurity, command & control, common operating picture (COP), and management & operations) for AI application (e.g., cyberattack classification application), in turn, leading to quicker and more accurate predictions by an AI agent (e.g., AI agent of the cyberattack classification application).

ML can use algorithms to parse data into certain contexts (e.g. kinds of cyberattacks), learn from that data, and make informed decisions based on what it has learned. DL can be a subfield of ML. DL structures algorithms in layers can create an artificial neural network (ANN) that can learn and make intelligent decisions (e.g. predictions of kinds of cyberattacks) on its own.

Figure 4:
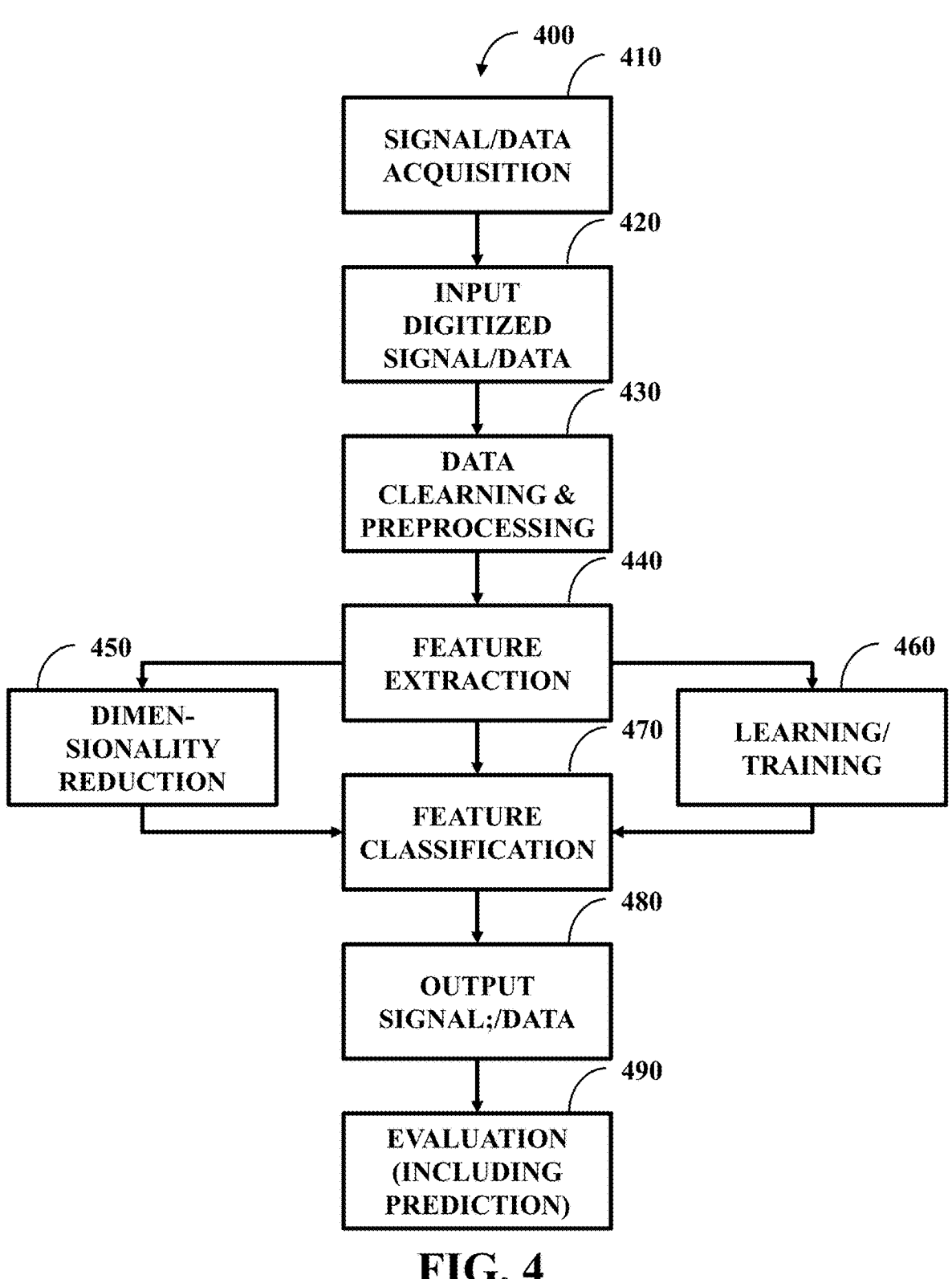
FIG. 4 illustrates one embodiment of a method comprising nine actions.

FIG. 4 illustrates one embodiment of a method 400 comprising nine actions 410-490. The method 400 can comprise signal/data acquisition at 410, digitization at 420, preprocessing at 430, feature extraction at 440 (e.g., concurrent with dimensionality reduction at 450 and/or learning/training at 460), feature classification at 470, outputting signal/data at 480, and evaluation at 490. Learning/training at 460 can be done by the models before applying for prediction at 490. An AI agent can acting behind to lead the learning process of AI/ML/DL techniques (e.g., feature extraction at 440, dimensionality reduction at 450, feature classification at 470, and prediction at 490).

A trainer component can initially train the AI agent (e.g., a component configured to perform the method 400) to learn a particular application (e.g. classification like modulations, channel access protocols, routing protocols, transport protocols, messaging protocols, audio/video coding, text, audio conferencing, videoconferencing, cybersecurity, command & control, common operating picture (COP), and management & operations) processes including feature extraction at 440, dimensionality reduction at 450, classification, at 470, and prediction at 490 using a form of learning mechanism such as supervised learning using known labeled signal/data sets. Then the trainer component or AI agent itself can use unknown unlabeled signal/data sets for labeling with appropriate classification (e.g., kinds of cyberattacks).

In one embodiment, actions 410 and 420 employ non-ML/DL algorithms while actions 430-480 employ ML/DL algorithms, with action 490 employing ML/DL model evaluations. However, other implementations can be practiced, such as 410-480 employing ML/DL algorithms.

At 410, the signal/data acquisition (SAQ/DAQ) can be the process of acquiring information from a system in digital form, such as through sampling, and be performed by a SAQ/DAQ system (e.g., implemented by a SAQ/DAQ component). The SAQ/DAQ system can convert physical parameters to electrical signals. The SAQ/DAQ system can employ signal conditioning circuitry to convert sensor signals into a form that can be converted to digital values. An analog-to-digital converter, that is part of the SAQ/DAQ system, can convert conditioned sensor signals to digital values. The SAQ/DAQ system can implement as AI/ML/DL-enabled or non-AI/ML/DL-enabled.

At 420, the signal or data can be sampled for digitization, such as by a digitization component. In one example, a sensor's physical parameters are converted into electrical signal that could be in analog form. Once digitized information available is, the AL/ML/DL processes can be started if not already done.

At 430. signal/data clearing and preprocessing can be performed by a clearing component. This can remove noises and otherwise prepare a signal for further processing. Example processing can include text processing (e.g., emails, files, web pages), tokenization, stop word identification, capitalization, slang and abbreviation processing, noise removal, spelling correction, stemming, and lemmatization. These example processes can be performed by one or more ML/DL algorithms.

At 440, an extraction component can perform feature extraction. In machine/deep learning, an initial set of actionable non-redundant features (e.g., values) that have been extracted from the measure data can be used to meet the desired objectives such as facilitating the subsequent learning and generalization step. The initial set of features can be called the full set of features with no redundant features. The extraction component can select the feature extraction algorithm based on the application. For example, with text (e.g., emails, files, web pages) the following feature extraction algorithms can be used: Syntactic Word Representation (e.g., N-Gram, Syntactic N-Gram), Weighted Words (e.g., Bag-of-Words (BoW)/Beg-of-Feature (BoF), Limitation of Bag-of-Words (BoW), Term Frequency-Inverse Document Frequency (TF-IDF)), and/or Word Embedding (e.g., Word-to-Vector (Word2Vec) including Continuous Bag-of-Words Model and/or Continuous Skip-Gram Model, Global Vectors for Word Representation (GloVe), Fast Text (FastText), Contextualized Word Representations). The extraction component can select the algorithms(s) to produce the best feature extraction results.

At 450, with the full set of non-redundant features made available at 440, a feature component can identify the useful features and select a final feature set from the useful feature set for an applications (e.g., including text). In one example, the feature component performs a trial and error method to reduce the dimensionality of the features that are absolutely useful minimum feature set. Example dimensionality reduction ML/DL algorithms that can be employed at 450 can include: Component Analysis (e.g., Principal Component Analysis (PCA), Independent Component Analysis (ICA)), Linear Discrimination Analysis (LDA), Non-Negative Matrix Factorization, Random Projection (e.g., Random Kitchen Sinks, Johnson Lindenstauss Lemma), Autoencoder (e.g., Conventional Autoencoder Architecture, Recurrent Autoencoder Architecture), and/or t-distributed Stochastic Neighbor Embedding (t-SNE).

Dimensionality reduction practice at 450 can improve computational time and reduce memory complexity. In one embodiment, the PCA algorithm attempts to find orthogonal projections of the data set which contain the highest variance possible in order to extract linear correlations between variables of the data set. The PCA algorithm can be computationally complex, so a random projection technique can be employed. In one embodiment, the LDA algorithm can be considered a supervised technique for dimension reduction that can improve the predictive performance of the extracted features. In one example, this can be achieved with manually inputted various portions ad we as desire labeled data. In one embodiment, the random projection algorithm can be used because it may be faster computationally than other algorithms (e.g., the PCA algorithm). However, the random projection algorithm may struggle with small data sets. In one embodiment, Autoencoders can use a relatively large amount of data to train and therefore may be beneficial when large data sets are present. In one embodiment, t-SNE can be used for data visualization in text and document data sets.

At 470, a classification component can classify the feature. Part of this can include choosing which classifier to use. Various ML techniques can be used for classification, such as Rocchio Classification (e.g., Boosting and Bagging), Logistic Regression (e.g., Combining Instance-Based Learning and Logistic Regression (LR) and Multinomial Logistic Regression), Naïve Bayes Classifier (e.g., High-Level Description of Naïve Bayes Classifier, Multinomial Naïve Bayes Classifier, Naïve Bayes Classifier for Unbalanced Classes), K-Nearest Neighbor (KNN) (e.g., Weight Adjusted K-Nearest Neighbor Classification), Support Vector Machine (SVM) (e.g., Binary-Class SVM, Multi-Class SVM, String Kernel, Stacking SVM, Multiple Instant Learning (MIL)), Design Tree, Random Forest (e.g., Voting), and/or Conditional Random Field (CRF). Various DL techniques can be used for classification, such as: Deep Neural Networks, Recurrent Neural Network (RNN) (e.g., Long Short-Term Memory (LSTM), Gated Recurrent Unit (GRU)), Conventional Neural Networks (CNN), Deep Belief Network (DBN), Hierarchical Attention Networks (HAN), Combination Techniques (e.g., Random Multi-model Deep Learning (RMDL), Stochastic Gradient Descent (SGD) Optimizer, Root Square Mean Proportionate (RMSProp) Step Size Optimizer, Adam Optimizer, Adaptive Gradient Algorithm (Adagrad) Optimizer, Adaptive Learning Rate per Dimension (Adadelta) Optimizer, Hierarchical Deep Learning for Text (HDLTex), Recurrent convolutional neural networks (RCNN), and/or CNN with LSTM (C-LSTM)).

Non-parametric techniques can be used as classification tasks such as KNN. SVM is a classification technique which employs a discriminative classifier for document categorization. This technique can also be used in different domains of data mining such as bioinformatics, image, video, human activity classification, safety and security, etc. This model can also be used as a baseline for comparison purposes.

Tree-based classifiers such as decision tree and random forest can be used with respect to document categorization.

Also, graphical classifications can be considered a classification task such as conditional random fields (CRFs). These techniques can be used, for example, for document summarization and automatic keyword extraction. Meanwhile, DL algorithms can rely on their capacity to model complex and non-linear relationships within data. In one embodiment, a minimum set of algorithms can be used to test applications for better classification before making final decision. The final decision of feature classification algorithm can be applied to the data set and the result can be outputted by an output component at 480.

At 490, an evaluation component can evaluate applications including text. Understanding how a model performs can be useful to the use and development of text classification methods (e.g., part of the learning/training at 460 by a trainer component). Example evaluation methods can include: Accuracy Calculation, Confusion Matrix, Macro- and Micro-Averaging, Fb Score, Matthews Correlation Coefficient (MCC), Receiver Operating Characteristics (ROC), and/or Area under the ROC Curve (AUC). In one embodiment, two or more evaluation algorithms can be employed to produce a prediction.

Figure 5:
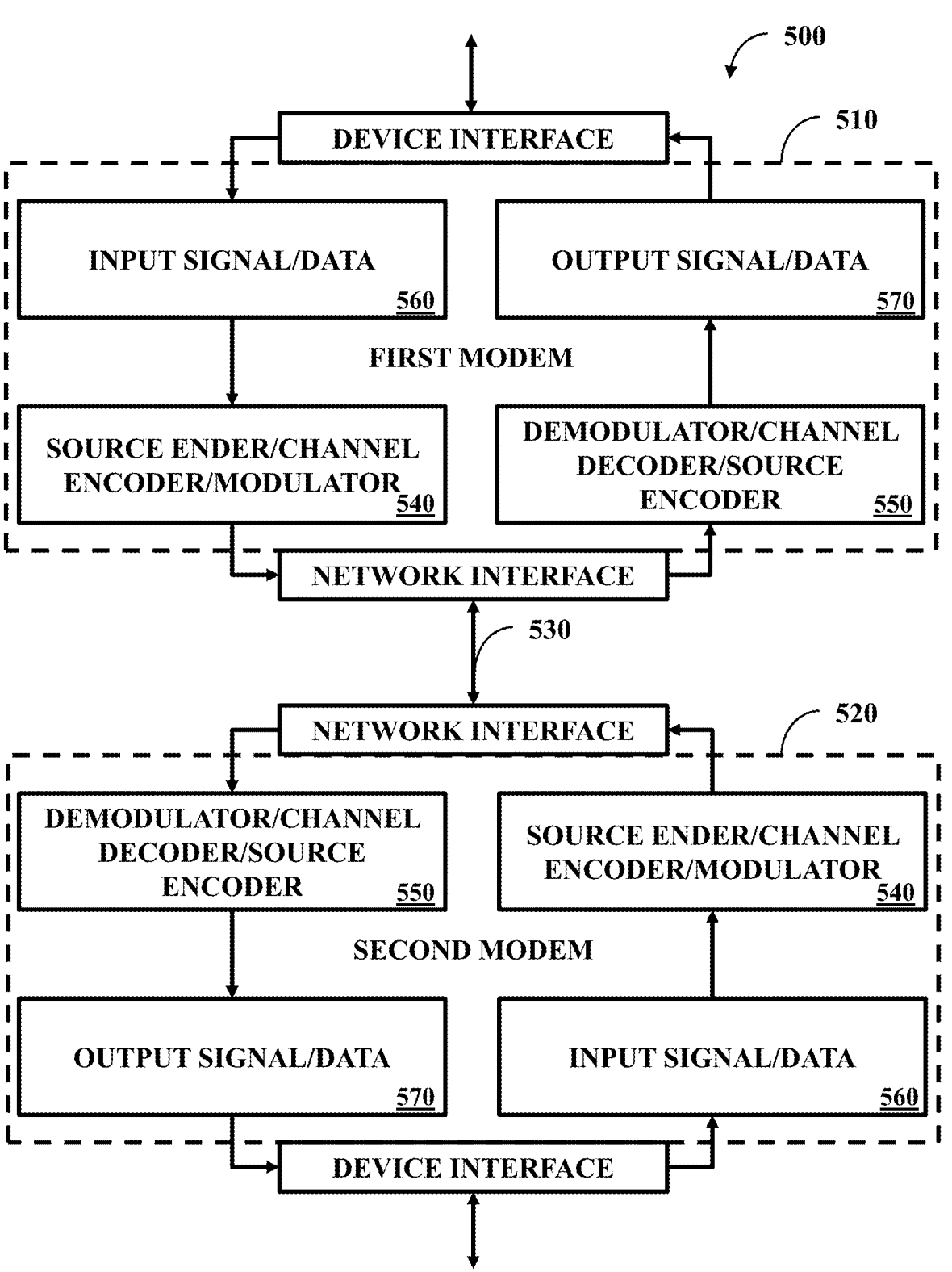
FIG. 5 illustrates one embodiment of a network comprising a first modem and a second modem.

FIG. 5 illustrates one embodiment of a network 500 comprising a first modem 510 and a second modem 520. The network 500 can employ AI/ML/DL techniques. Example areas the network 500 can operate include message/file retrieval, message filtering, human/cognitive behavior, knowledge management, healthcare, marketing, advertising, warfighters, medicines, chemistry, physics, finance, etc.

Aspects disclosed herein can make different capabilities AI/ML/DL-enabled and communication network-enabled, along with the communications of the network 500 itself AI/ML/DL-enabled (e.g., for obtaining better throughput capacity and performances) as well as the use of common infrastructure comprising AI applications and ML/DL middleware platforms for scalability and thereby economies-of-scale for capabilities AI/ML/DL-enabled.

The different applications can be grouped into different OSI Layers as discussed with FIG. 1. In one example, the network 500 can operate in OSI Layers from 1-4. The network 500 can be made AI/ML/DL-Enabled using the method 400 of FIG. 4.

The physical layer (OSI Layer 1) can be responsible for transmission and reception of raw bits over a communication link or channel 530. The physical layer link/channel 530 can be a physical wire or wireless. Traffic multiplexing, modulation scheme, data rate, channel access method, physical connectors, simplex, full/half-duplex, timing, frequency, voltage level, and others can be functions performed at the physical layer.

In physical layer, modulation/demodulation can be a primary function. Modulation/Demodulation can be the manipulation of the amplitude, frequency or phase of an electromagnetic (EM) wave with the intent of transmitting information. The transmitter (e.g., first modem 510) and receiver (e.g., second modem 520) can agree to particular modulation scheme ahead of time to allow this information sharing to occur.

If the modems 510 and 520 are AI/ML/DL-enabled performances such as bit-error-rate (BER) can be almost negligible to non-enabled and the channel capacity can be almost nearer to normal Shannon Channel Capacity. Being AI/ML/DL enabled, the Source Ender/Channel Encoder/Modulator 540 and Demodulator/Channel Decoder/Source Encoder 550 can be implemented by way of an ML/DL network (e.g., neural network). Aspects of this can include practice of the method 400 of FIG. 4, such as cleaning & preprocessing at 430 (e.g. noise removal), modulation feature extraction at 440 & dimensionality reduction at 450 (e.g., dispersion, nonlinearity, loss, span count, span length), and modulation feature extraction at 470 (e.g., DP-2QAM, DP-4QAM, DP-1600M, and DP-640AM). Similarly the input signal/data 560 can function with actions 410 and 420 while the output signal/data 570 can function with the action 480 and can operate with symbol rate, roll-off, launch power, and channel load.

Performance of neural networks for a modulation classification task can achieve very high levels of accuracy over a large range of modulation types under nominal channel distortions. A convolutional neural network and/or a residual neural network can be used and achieve accuracies of over 80-90%. Training with specific signal/data using specific chosen from the common set of software repositories of algorithms tuning their parameters to those specific signal/data can be used for the Physical Layer (OSI Layer 1).

In one embodiment, the first modem 510 and/or the second modem 520 can be designed with specific AI/ML/DL embedded hardware as stand-alone hardware. In another embodiment, the first modem and second modem can have common AI/ML/DL computing processes for various OSI Layers in devices (e.g., smart phones, soldier radio waveform (SRW) radios, and application servers). In one embodiment, the first modem 510 and/or the second modem 520 can employ an AI Agent to implement a ML/DL model set to perform at least some of the actions of the method 400 of FIG. 4.

The medium access control (MAC)/Link Layer (OSI Layer 2) can employ a MAC protocol in wire-line/wireless networks (e.g., such as the network 500) with multiple levels of heterogeneity. One practice for programming MAC logic in an embedded wireless node can be to implement protocols such as ALOHA, Slotted-ALOHA, carrier sense multiple access (CSMA), and CSMA with collision avoidance (CSMA-CA) (e.g., Wi-Fi, BT, etc.) depending on the available lower layer hardware support. The choice of such protocols can be driven by heuristics and network design experience. While such choices provide a standard method for network and protocol deployment, they do not necessarily maximize the MAC layer performance in a fair manner, especially in the presence of network and data heterogeneity. An example is when nodes without carrier sensing abilities run AOLHA family of protocols, their performance can start to degrade due to collisions when the application traffic load in the network 500 exceeds an optimal level. Such problems are further compounded in the presence of various forms of heterogeneity in terms of Acknowledgement (ACK), No-ACK, Fragmentation/Aggregation, Fragmentation Threshold, Back-off, Request-To-Send (RTS)/Clear-To-Send (CTS), Network Allocation Vector (NAV), NAV Timeout, Contention Window (CW), Traffic Load, Topology, Node-specific Access priorities. A reason for such performance gap can be that the nodes are statically programmed with a protocol logic that is not cognizant of time-varying load situations and such heterogeneities. The AI/ML/DL-Enabled MAC implementation upon the network 500 can allow wireless nodes to learn how to detect such conditions and change transmission strategies in real-time for improving the network performance, even under node-specific access prioritization.

AI/ML/DL-Enabled MAC can model the MAC layer logic as, for example, a Markov Decision Process (MDP), and solve it dynamically using, for example, Reinforcement Learning (RL) as a temporal difference solution under varying traffic and network conditions. An MDP solution can have the correct set of transmission actions taken by the network nodes, which act as the MDP agents. RL provides opportunities for the nodes to learn on the fly without prior training data. The example model allows to provision for heterogeneous traffic load, network topology, and node-specific priority while striking a balance between node level and network level performance. Learning adjustments to temporal variations of such heterogeneities and access priorities can be supported by leveraging the inherent real-time adaptability of RL. Nodes can learn to self-regulate collisions in order to attain theoretically maximum MAC level performance at optimal loading conditions. For higher load, the nodes can learn to adjust their transmit probabilities in order to reduce the effective load, maintain low levels of collisions, thus maintaining the maximum MAC level performance.

With the MAC/Link layer being in OSI Layer 2, it can work between the network layer (OSI Layer 3) and the physical layer (OSI Layer 1). The traffic payload can come from both layers 1 and 3 depending on the direction of transmission. However, the general mechanism of AI/ML/DL-Enabled MAC still remains the same, such as the MAC input comprising Acknowledgment (ACK), No-ACK, Fragmentation/Aggregation, Fragmentation Threshold, Back-off, Request-To-Send (RTS)/Clear-To-Send (CTS), Network Allocation Vector (NAV), NAV Timeout, Contention Window (CW), Traffic Load, Topology, Node-specific Access priorities, or a combination thereof.

Specific characteristics of AI/ML/DL-Enabled MAC can be, for example an MDP can be used as the MAC layer generic logic solving problems using RL. RL can have the ability to make the agents/nodes self-regulate their individual traffic loads in order to attain and maintain the theoretically maximum throughput even when the application level traffic load is increased beyond the point of optimality. The RL mechanism can be enhanced to handle heterogeneous traffic load. Node-level access priorities can be incorporated in the native learning process. A concept of MDP formulation and RL solution can be used for non-fully connected network topologies. The wire-line/wireless nodes with AI/ML/DL-enabled MAC can use more simplifies run a rudimentary MAC logic without relying on carrier sensing for example and other complex features from the underlying hardware. The developed mechanisms could be suitable for very simple transceivers that are found in low-cost wireless sensors, Internet of Things (IoTs), and other embedded devices.

The network layer (OSI Layer 3) can be concerned with controlling operations of the network 500 (e.g., a subnetwork set of the network 500). A key function of the network layer protocol can be how a packet is routed from the source to the destination that can be connected over the network 500 many hops away from the source. A standardized network routing protocol (e.g. Open Short Path First (OSPF), Border Gateway Protocol (BGP), and others) can be used to determine which next hop network node is in the best situated in the path to the destination node resolving the network layer address of the destination node. In addition to routing protocol, multicast group management, network-layer information and error, and network-layer address assignment can be functions of the network layer. Note that it can be the function of the payload that makes these belong to the network layer (e.g., as opposed to the function of the protocol that carries them).

Networks can be complex interacting systems involving cloud operations, core and metro transport, and mobile connectivity all the way to video streaming and similar user applications. With localized and highly engineered operational tools, it can be typical of these networks to take days to weeks for changes, upgrades, or service deployments to take effect. With OSPF routing, the packets can be delivered via the same path after quality-of-service (QOS) provisioning because of difficulties in performing multipath routing, and this can waste resources along the other links and lead to network congestion.

Hardware-centric innovations can be employed for instance, via photonic integration, graphene, space division multiplexing, using multi-domain optical network, and encompassing core, metro, and access networks. The various network segments can work together to support multi-layer services and applications, either directly or through a hybrid wireless/wireline infrastructure. As an example distinction, optical networking and its routing can belong to the link layer (OSI Layer 2) while OSPF routing over the Internet Protocol (IP) network can belong to the network layer (OSI Layer 3). However, the process for routing can remain and can generally refer to OSI Layer 3 for simplicity. This diverse, dynamic, and complex mesh of networking stacks, together with future mobility constraints, can benefit from smart and end-to-end service-oriented software frameworks using AI/ML/DL algorithms to augment conventional hardware advancements.

AI/ML/DL algorithms can be characterized by a unique ability to learn system behavior from past data and estimate future responses based on the learned system model, such as through action 480 of FIG. 4. In one example, with computational hardware and parallel computing, the features like the AI/ML/DL-Enabled multipath routing along with dynamic QOS provisioning can be implemented.

An AI/ML/DL-based routing component can construct a sequence of tuples of vectors representing a traffic matrix and vectors representing a routing solution. The heuristic-based routing component can compute a heuristic-based routing solution and returns it to both a data-acquisition-and-results-reporting component and a dataset storage location.

A set of tuples in the data warehouse can be identified by data analytics and by a training management component to train the ML-based routing component. In one example, in supervised learning, a feed-forward deep neural network (DNN) learns a mapping function that best maps input traffic matrix to multi-path route output in such a way that is the best match based on a-priori known labeled training dataset. Once the mapping function is learned, the AI/ML/DL-based routing component can compute real-time estimates of the routing solution, that is, multi-path routes with appropriate traffic distribution to meet QOS constraints.

The AI/ML/DL-based multipath routing component can operate based on a feed-forward Deep DNN algorithm. Fractional values of multi-path routing output make the DL structure a multi-output regression model. The DNN can comprise fully connected layers out of which, in one example, two are hidden, one is input layer, and one is output layer. A dropout out technique can be applied in both hidden layers to enhance the model robustness against overfitting. Furthermore, an adaptive moment estimation, such as Adam optimization algorithm, can be adopted to train the DL network and minimize the prediction mean square error (MSE).

For a routing scheme, a multipath routing data input component can supply, as the input signal/data 560, a network status from neighboring routes/nodes and traffic matrix with traffic flows to the AI Agent (e.g., the AI Agent being a component of the first modem 510). The AI Agent can perform at least part of the method 400 of FIG. 4. This can produce, as the output signal/data 570, multiple paths/routes for routing from a given source (e.g., the first modem 510) to the destination (e.g., the second modem 520), such as a source-destination pair, with fractional traffic flow in various paths/routes with QOS optimization.

During initialization, the input component, such as part of data acquisition and results reporting, collects the network status and traffic matrices from the router and forwards it to the heuristic-based AI/ML/DL-Enabled routing component. The heuristic-based AI/ML/DL component, such as one that uses a DNN, can compute a heuristic-based multipath routing solution and can return it to the multipath routing output component along with fractional traffic for individual paths. However, before DNN is initialized for multipath route computation, DNN can be trained with sufficient known labeled routing traffics by data analytics (e.g., online or offline).

Once the DNN is trained, the AI/ML/DL-based routing component can generate routing solutions and report them to the data-acquisition-and-results-reporting component, which forwards them to a router. At this stage, the routing solutions received from the heuristic-based routing component can be used to update the data storage, and ones received from the AI/ML/DL-based routing module can be forwarded to the router in real-time. The DNN design can be finalized after several trial and error experiments. Various design versions can be considered until the best performance is achieved in both training and testing evaluations. AI/ML/DL-Enabled multipath OSPF can be improved in comparison to the legacy single-path open shortest path first (OSPF) protocol in terms of signaling overhead, network delay and throughput. A choice component can choose the specific parameters for an application, for example OSPF, and can tune the algorithms appropriately with the OSPF routing to make it AI/ML/DL-Enabled Multipath Routing.

The basic function of the transport layer (OSI Layer 4) that is situated between the session (Layer 5) and the network layer (Layer 3) can be to accept data from the session layer, then split into smaller packets as permitted per the network layer, and pass to the network layer ensuring that the packets will arrive correctly (for connection oriented transport protocol such as Transmission Control Protocol (TCP) standardized in the IETF and others) at the destination. It implies that the reliability of a given link can be controlled by the transport layer through flow control, segmentation and de-segmentation, and error control. The connectionless transport protocol can be used (e.g. User Datagram Protocol (UDP) standardized in the IETF and others) and the reliability services of the packets are pushed to the upper application layer using proprietary mechanisms and flow control.

TCP operation over the network can at times be suboptimal, especially for frequent transfer of large files of arbitrary sizes to network performance degradation, including queuing delays and packet drops. Solutions can be used to predict different aspects of TCP performance such as throughput or packet loss prediction and can be centered on, for example, two approaches: formula-based and history-based predictions. Formula-based methods predict performance aspects using mathematical expressions that relate the predicted variable to path and end host properties such as Round Trip Time (RTT) or the receiver's window size. In some cases, measurements for the aforementioned properties can gathered using different active or passive network measurement tools.

History-based approaches produce a time series forecast of the desired attribute (e.g., packet loss) based on measurements derived from previous file transfers, collected either passively (e.g. through monitoring a link) or actively (e.g. by conducting file transfers of different size). Although for certain aspects of TCP performance, history-based approaches can be more accurate than formula-based predictions, solutions can focus on predicting network throughput. However, these methods can struggle to accurately predict end-to-end packet loss, manifested in the number of retransmitted packets in high-energy scientific application flows of arbitrary size, and network throughput so that TCP can control the flow of packet transmissions and retransmissions. In view of this, AI/ML/DL-Enabled TCP can be used.

AI/ML/DL-Enabled TCP can build automatically a loss classifier for predicting end-to-end packet loss, manifested in the number of retransmitted packets in science flows of arbitrary size, queueing delay, end-to-end roundtrip delay, and network throughput. It can take into account both formula- and history-based methods in addition to measurements of path and host attributes from previous data transfers in real-time. ML algorithms like Random Forest Regression, Decision Tree Boosting, and others can be employed.

For a routing scheme, a data input component can supply, as the input signal/data 560, TCP max segment size, average Round Trip Time, file size, flow duration, throughput, source IP address, destination IP address, and TCP initial congestion window to the AI Agent (e.g., the AI Agent being a component of the first modem 510). The AI Agent can perform at least part of the method 400 of FIG. 4. This can produce, as the output signal/data 570, a prediction (e.g., with the AI Agent performing action 490 of FIG. 4) of packet loss due to congestion or other network faults, end-to-end packet loss due to retransmission of high-energy scientific applications, or other network faults.

Since retransmissions can be mostly due to physical loss along a selected path and suboptimal end host network tuning, different combinations of end host properties (e.g., TCP max segment size) and path-related measurements (e.g., Round Trip Time) can be taken into account in the model. There can be many number of collected measurements of features, which provide an overly generalized solution with increased computational cost. In view of this, the following features can be selected: TCP max segment size, average Round Trip Time, File size, Flow duration, Throughput, Source IP Address, Destination IP Address, and TCP initial congestion window.

With such a classifier, the modified protocol can proceed as follows: each time a loss is detected by a triple duplicate, its cause can be determined by the classification model (e.g., implemented as a classification component). If the packet loss/end-to-end packet loss is classified as due to a congestion, the sender proceeds as usual (e.g., sender divides its congestion window by two). If the end-to-end packet loss is due to retransmission of high-energy scientific applications, it would allow both scientists of the high-energy scientific applications and network operators to mitigate packet loss through different host or flow reconfiguration techniques. Otherwise, it maintains its congestion window constant. The advantage of such end-to-end methods is that they do not require the support of the networks and hence they can be more easily deployed in practice.

The middleware layer can comprise the session layer (OSI layer 5) and the presentation layer (OSI layer 6). The session layer can allows users on different computers/machines to establish a session between them controlling the dialog. It establishes, manages and terminates the connections between the local and remote application. It can provide functions such full/half-duplex, or simplex operation, and establishes procedures for check-pointing, suspending, restarting, and terminating a session. Note that when the Internet Protocol Layer stack does not contain the session layer, the suspending and closing function of the session of connection oriented transport protocol (e.g. TCP) can be merged with the lower transport layer (OSI Layer 4) as TCP establishes a session (OSI Layer 5). Audio/Video Coding can belong to the presentation layer. Similarly, other applications such message format conversion can also belong to the session layer. In practice, these two layers can be combined together using the term middleware layer because the functional elements of the session layer supports the applications residing in the application layer (OSI Layer 7) and these middleware functions can used among themselves to compose complex functionalities without obeying the hierarchy of the protocol layers as we see in OSI Layers.

Remote procedure call (RPC) is middleware protocol that is a form of client—server interaction (e.g., caller is client, executor is server), that can be implemented via a request—response message-passing system in a distributed environment. A computer program, implemented as a component, can initiate an RPC when a program causes a procedure (or subroutine) to execute in a different address space (e.g., another computer on a shared network, such as when a computer associated with the second router 520 does from the perspective of a computer associated with the first router 510). RPC can be coded as if it were a normal (local) procedure call, without the programmer explicitly coding the details for the remote interaction.

However, RPC may be suboptimal for distributed DL computation. This is because (i) deep learning computation uses tensor (or multi-dimensional matrix) as the main data type, which can comprise a plain byte array as tensor data and a simple schema as meta-data specifying the shape and element type of the tensor. A tensor is often of a sufficiently large size (tens of Kilobytes to Megabytes) and its metadata/data sizes often static. Using RPC for tensor data transfer may not provide evident advantage on programmability or efficiency; and (ii) using RPC can involve memory copy to and from RPC-managed communication buffers memory region and known statically.

A simple interface can expose a remote machine as a "device" from a data access point of view. This "device" can be connected through an AI/ML/DL-Enabled RPC channel that exposes control for parallelism. Remote memory regions can be allocated and directly accessed through this "device" interface, much like a local GPU. This maps naturally to the underlying AI/ML/DL-Enabled RPC network that provides direct remote memory access.

Based AI/ML/DL-Enabled RPC, a zero-copy cross-machine tensor transfer mechanism can be designed directly on the "device" interface. This can be done through a combination of static analysis and dynamic tracing on the dataflow graph of the computation in order to (i) figure out whether the size of individual tensors that are to be transferred across server can be statically known at the compile time, (ii) assess whether such a tensor should be allocated statically (e.g., for better efficiency) or dynamically (e.g., for reduced memory footprint), (iii) ensure allocation of the tensors on both the sending and receiving ends in the AI/ML/DL-Enabled RPC memory regions, and (iv) identify the source and destination addresses of tensors for AI/ML/DL-Enabled RPC transfer.

Audio coding technologies can leverage human perception of sound, or psychoacoustics, to reduce the bitrate while preserving the perceptual quality of the decoded audio signals. AI/ML/DL-enabled audio coding, for example, can decode signals more perceptually similar to the reference, yet with a much lower model complexity. The proposed loss function incorporates the global masking threshold, allowing the reconstruction error that corresponds to inaudible artifacts.

The application layer (OSI Layer 7) can be the layer where the end-user interacts directly with the software applications. There are opportunities to standardize some application layer protocols in the international standard forums such as SMTP for emails, Session Initiation Protocol (SIP) for Voice-over-Internet Protocol (VoIP), File Transfer Protocol (FTP) for file transfers, and others. In one example, Application-layer functions can include identifying communication parties, determining resource availability, and synchronizing communication.

The first modem 510 can be considered an AI-enabled, ML-enabled, DL-enabled modem (e.g., that is part of the network 500 with the second modem 520) as can the second modem 520. The source ender/channel encoder/modulator 540 can function as a modulator component configured to modulate a non-channel received signal (e.g., what is inputted into the device interface) for communication across the channel 530 that links the first modem 510 with the second modem 520 such that a modulated signal is produced. The demodulator/channel decoder/source encoder 550 can function as a demodulator component configured to demodulate a channel received signal for communication out of the first modem 510, the channel received signal being received from the second modem 520 such that a demodulated signal is produced.

The first modem 510 can comprise a signal cleaning component configured to remove extraneous information from the non-channel received signal to produce a cleaned signal, a feature extraction component configured to perform a feature extraction the cleaned signal to produce a feature set, and a feature classification component configured to classify the feature set to produce a classified feature set.

The demodulator/channel decoder/source encoder 550 can comprise a demodulator signal cleaning component configured to remove extraneous information from the channel received signal to produce a cleaned channel received signal. The demodulator/channel decoder/source encoder 550 can also comprise a demodulator feature extraction component configured to perform a feature extraction the cleaned signal to produce a channel received feature set. The demodulator/channel decoder/source encoder 550 can additionally comprise a demodulator feature classification component configured to classify the feature set to produce a channel received classified feature set.

The source ender/channel encoder/modulator 540 can comprise a modulator signal cleaning component configured to remove extraneous information from the non-channel received signal to produce a cleaned non-channel received signal. The source ender/channel encoder/modulator 540 can also comprise a modulator feature extraction component configured to perform a feature extraction the cleaned signal to produce a non-channel received feature set. The source ender/channel encoder/modulator 540 can additionally comprise a modulator feature classification component configured to classify the feature set to produce a non-channel received classified feature set.

The network interface of the first modem 510 can comprise a communication component configured to communicate the classified feature set to the second modem, where the feature extraction component is configured to perform the feature extraction through dimensionality reduction. The network interface of the first modem 510 can also comprise a non-second modem communication component configured to communicate the channel received classified feature set to destination other than the second modem, where the demodulator feature extraction component is configured to perform the feature extraction through dimensionality reduction. The network interface of the first modem can additionally comprise a second modem communication component configured to communicate the non-channel received classified feature set to the second modem, where the feature extraction component is configured to perform the feature extraction through dimensionality reduction.

The first modem 510 can comprise AI/ML/DL embedded hardware. The modulator component can modulate the non-channel received signal through employment of the AI/ML/DL embedded hardware. Additionally, the demodulator component can demodulate the channel received signal through employment of the AI/ML/DL embedded hardware.

Figure 6:
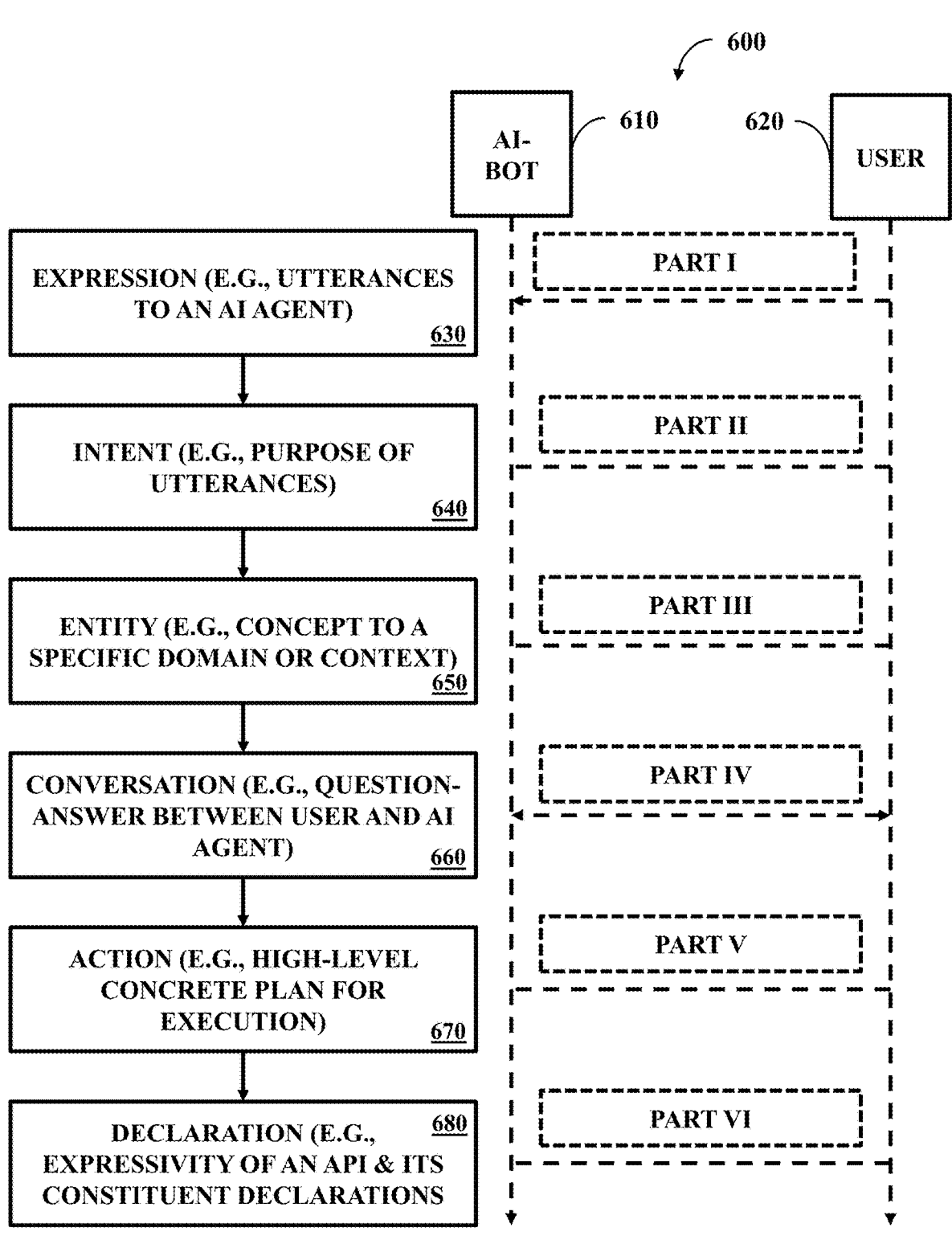
FIG. 6 illustrates one embodiment of a process flow.

FIG. 6 illustrates one embodiment of a process flow 600 (e.g., the left boxes implemented as a method). In one example, a cybersecurity application can be AI/ML/DL-Enabled. Application programming interfaces (APIs) can be used to assuming a specific function for retrieval from a repository.

A user 610 can invoke an AI-Bot 620 using natural language processing (NLP) AI application to know details about cyberattacks related. At 630, expression can occur of utterances to the AI Agent such as when the AI-Bot 620 recognizes when and where a cyberattack happened along with AI-Bot 620 recognizing the category of cyberattack (Part I).

At 640, intend can be determined, such as the purpose of utterances. In this example, the AI-Bot 620 can recognize that the intent of the utterance is cyberattack (Part II). At 650, entity can be determined with a concept to a specific domain or context. In this example, the AI-Bot 620 can recognize the context of this utterance that falls into domains of cyberattack and time/date (Part III).

At 660, there can be a conversation that is a question and answer between the user 610 and the AI-Bot 620 (e.g., functioning as AI Agent). In one example, the user 610 and the AI-Bot 620 can obtain missing information from one another (Part IV). At 670, action can occur to develop a high-level concreate plan for execution. In one example, the AI-Bot 620 finds a specific action to satisfy intent of the user 610, such as finding the cyberattack and certain parameters "type, entity-attacked, location" with command "find-cyber-attack(type, entity, location" (Part V). At 680, declaration can occur with the expressivity of an API and its constituent declarations. In one example, for the AI-Bot 620 to satisfy the intent of the user 610, the AI-Bot 620 communicates with many disparate functional entities that have registered their individual APIs in a global API registry for selection of an appropriate API with specific declarative parameters to satisfy a goal (Part VI).

This can produce an objective of mapping a natural language user expression into a concreate API call. A lot of complexities can be involved to resolve a command of the user 620 when using NLP and the API can be a beneficial solution to retrieve an appropriate function. Functions such as expression at 630, intent at 640, entity at 650, conversation at 660, action at 670, and declaration at 680 can satisfy the user command.

Figure 7:
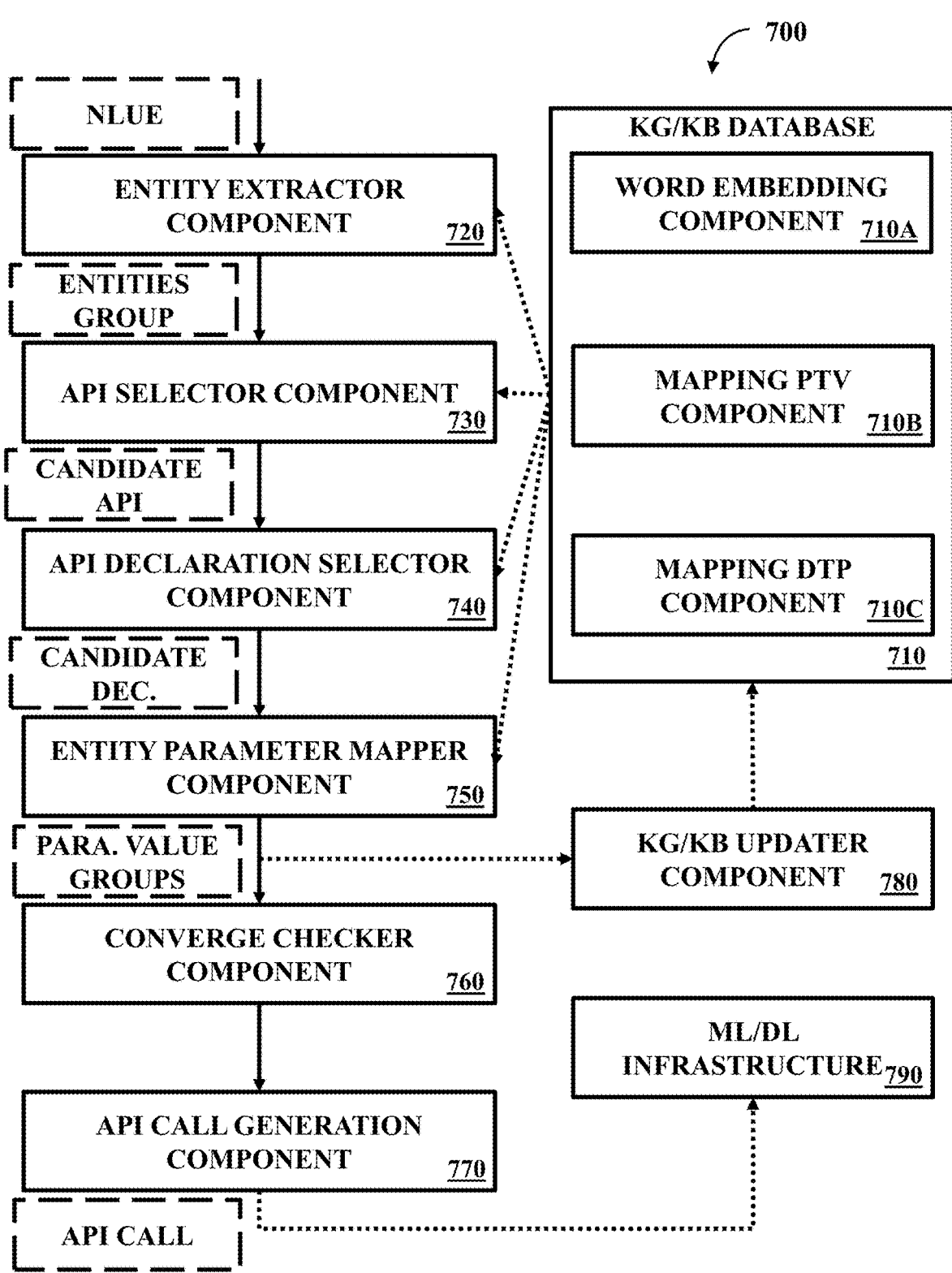
FIG. 7 illustrates one embodiment of an example cybersecurity application environment.

FIG. 7 illustrates one embodiment of an example cybersecurity application environment 700. The environment 700 can be employed to find a specific API whose functions will satisfy a user's command. A Knowledge Graph (KG) and Knowledge Base (KB) database 710 can be leveraged in the environment 700.

KG and KB can be two important functional entities that are used to appropriate API for resolving ambiguities of spoken words to the actual abilities/functions of the API in addition to other functional modules. ML/DL functions can be invoked to find detail results of cyberattacks with appropriate parameters (e.g., when and where cyberattacks happened, if so). Note that cyberattacks might happen at different times and at different places. From this use command, there may not be a specific time or place. As a result, a search might include a lot of computational results by ML/DL processes (e.g., stored in the database 710 or elsewhere). The basic training phase and detection phase of the AI/ML/DL-enabled cybersecurity application can function with the environment 700.

An additional AI application can be NLP. NLP application itself a huge process and can uses the same basic process in the environment 700. NLP AI and Cybersecurity applications can be trained and used for prediction.

A natural language user expression (NLUE) can be fed to an entity extractor component 720. The NLUE can be an utterance (e.g., one or more words). The entity extractor component 720 can filter this utterance can be filtered to obtain useful words. This can be done by leveraging the word embedding component 710A (e.g., that can be part of the database 710). The word embedding component 710A can use ML/DL to understand an intent of a user and based on this the component 720 can output an entities group.

The entities group can be fed to an API selector component 730. The API selector component 730 can select a set of viable APIs to satisfy the user's intent. The API selector component 730 can use the word embedding component 710A in making the selection. The set of viable APIs can be a set of candidate APIs sent to the API declaration selector component 740.

The API declaration selector component 740 can apply expressivity (e.g., in the form of declaration) upon individual APIs of the candidate APIs. This matches the individual APIs with inputted user expressions. In one example, this is accomplished by leveraging the ML/DL features of the word embedding component 710A to select a best matching API as the candidate declaration set and associated API, which can be transferred to the entity parameter mapper component 750.

The entity parameter mapper component 750 can take entities selected by the entity selector and match these to parameters of the best matching API. This can be done thorough use of the word embedding component 710A as well as the mapping parameters-to-values (PTV) component 710B and the mapping declaration-to-parameters (DTP) component 710C. A parameter value group can transfer to a converge checker component 760.

The converge checker component 760 can chose a best match declaration, such as one with a maximum number of parameters fulfilled amongst candidate API declarations before an API call is generated by the API call generation component 770. The best match declaration can be determined through employment of the mapping DTP component 770C.

Additionally, a KG/KB updater component 780 can function with a feedback loop to update the database 710, such as updating the mapping PTV component 710B. This can be done concurrently with generation of the API call. ML/DL infrastructure 790 can process NLP services invoking the API call to a general purpose ML/DL API (e.g., with results being sent back to the NLP).

The ML/DL infrastructure (e.g., common AI/ML/DL platform) can act as the middleware (OSI Layers 5 and 6) and be employed to make an application AI-enabled for communications networking. A core set of AI applications and ML/DL algorithms/models can be reused to make individual capabilities of different OSI layers AI-enabled or AI/ML/DL-enabled.

The ML/DL infrastructure, such as when implemented as the AI/ML/DL platform, can comprise two parts: common AI application infrastructure and common ML/DL computing infrastructure. The common AI application infrastructure can comprise a set applications that make an application (OSI Layer 7) AI-enabled while the ML/DL infrastructure can be invoked by one or more AI applications to solve the problems using certain algorithms/models as appropriate which can benefit from more intensive computation. Example AI applications can include NLP Platform (e.g., content extraction/classification/machine transformation/questions answering/test correlation), Expert System Platform, KB, KG, Ontology, Vision Platform (e.g., image processing/machine vision), Speech Platform (e.g., text-to-speech/speech-to-text), Robotics Platform, etc.

Explainable Artificial Intelligence (XAI) can be part of AI with automatic explanations of the results so that end-users can understand what the result means. XAIs can work with causal inference with reflection-based ML/DL). Additionally, there can be a common ML/DL middleware infrastructure. An ML/DL Infrastructure Platform can function with supervised Learning, unsupervised Learning, and reinforcement Learning.

Multiple ML/DL algorithms/models groups can function in middleware. A first algorithm group can be Signal/Data Preprocessing, Noise Removal, Tokenization; Stop Words, Capitalization, Slang and Abbreviation, Spelling Correction; Stemming, Lemmatization, etc.

A second algorithm group can be Syntactic Word Representation, N-Gram and Syntactic N-Gram, Weighted Words: Bag-of-Words (BoW)/Beg-of-Feature (BoF), Limitation of Bag-of-Words (BoW), and Term Frequency-Inverse Document Frequency (TF-IDF), Word Embedding-Word-to-Vector (Word2Vec), Continuous Bag-of-Words Model and Continuous Skip-Gram Model, Word Embedding-Global Vectors for Word Representation (GloVe), Word Embedding-Fast Text, Word Embedding-Contextualized Word Representations, etc.

A third algorithm group can include Component Analysis, Principal Component Analysis (PCA), Independent Component Analysis (ICA), Linear Discrimination Analysis (LDA), Non-Negative Matrix Factorization, Random Projection, Random Kitchen Sinks, Johnson Lindenstauss Lemma, Autoencoder, Conventional Autoencoder Architecture and Recurrent Autoencoder Architecture, t-distributed Stochastic Neighbor Embedding (t-SNE), Belief Network, Hidden Markov Model (HMM), Profile Hidden Markov Model (PHMM), Fuzzy Systems, etc.

A fourth algorithm group can include Rocchio Classification, Boosting, Bagging, Logistic Regression (LR) Combining Instance-Based Learning and Logistic Regression (LR) and Multinomial Logistic Regression, Naïve Bayes Classifier/High-Level Description of Naïve Bayes Classifier, Multinomial Naïve Bayes Classifier and Naïve Bayes Classifier for Unbalanced Classes, K-Nearest Neighbor (KNN)/Weight Adjusted K-Nearest Neighbor Classification, Support Vector Machine (SVM)/Binary-Class SVM/Multi-Class SVM/String Kernel/Stacking Support Vector Machine (SVM)/Multiple Instant Learning (MIL), Design Tree, Random Forest/Voting, Conditional Random Field (CRF), Neural Tuning Machine (NTM), etc.

A fifth algorithm group can include Deep Neural Networks, Recurrent Neural Network (RNN)/Long Short-Term Memory (LSTM) and Gated Recurrent Unit (GRU), Conventional Neural Networks (CNN), Deep Belief Network (DBN), Hierarchical Attention Networks (HAN), Combination Techniques (e.g., Random Multi-model Deep Learning (RMDL), Stochastic Gradient Descent (SGD) Optimizer, Root Square Mean Proportionate (RMSProp) Step Size Optimizer, Adam Optimizer, Adaptive Gradient Algorithm (Adagrad) Optimizer, Adaptive Learning Rate per Dimension (Adadelta) Optimizer, and Hierarchical Deep Learning for Text (HDLTex)), Recurrent convolutional neural networks (RCNN), CNN with LSTM (C-LSTM), etc.

A sixth algorithm group can be employed in evaluating through the following models that can belong to the middleware: Confusion Matrix; Macro- and Micro-Averaging, $F\_\beta$ Score, Matthews Correlation Coefficient (MCC), Receiver Operating Characteristics (ROC), and Area under Receiver Operating Characteristic (ROC) Curve (AUC).

The firth group can be used for data clearing and preprocessing (430 of FIG. 4). The second group can be used for feature extraction (440 of FIG. 4) while the third group can be used for dimensionality reduction (450 of FIG. 4). The fourth and fifth groups can be used for feature classification (470 of FIG. 4). The sixth group can be used for performance evaluation of AI/ML/DL algorithms/models (490 of FIG. 4). It should be noted that these grouping are not restrictive and algorithms in one group can be used in a different group.

An AI-enabled application, such as cybersecurity, can have an AI agent that invokes one or a set of core AI applications based on the requirements of application (e.g., cybersecurity requirements). For cybersecurity, the user 620 of FIG. 6 might have to know when (time) and where (place & functional entity/resource) the cyberattack has happened in the network invoking the voice command (say, NLP AI application) to the AI-bot 610 of FIG. 6 (e.g., AI agent). In turn, NLP can invoke appropriate ML/DL algorithms/models to process the user command to get the answer. The answer means the prediction of time (when) and where (resource) the cyberattack has happened over the communications network.

In one embodiment, the entire AI/ML/DL process can be generalized as: Preprocessing, Feature Extraction, Dimensionality Reduction, Classification/Prediction, and Evaluation. These can correspond to actions of FIG. 4. FIG. 4 is technology-agnostic and can also be application for XAI.

Signal/data clearing and preprocessing can be used to remove noises. Processes that can be used for taking noises out can depend on the types of applications. In ML/DL, the initial set of actionable non-redundant features (values) that have been extracted from the data can be used to meet desired objectives such as facilitating the subsequent training/learning and generalization for using the trained models without being limited to specific cases. In at least some cases that can ultimately lead to better human understanding. The initial set of features can be called a full set of features with no redundant features. Many ML/DL feature extraction algorithms can be available, but what feature extraction algorithms should be selected can depend on the kind of application(s). It should be noted that there can be many feature extraction algorithms that are suitable for a given AI-enabled application. One might use one or more feature algorithms suitable for that particular application, such as using many algorithms and selecting a best algorithm that yields superior results.

Once the full set of non-redundant features is available, identification can occur of a useful feature set and then selection of a final feature set from these useful feature set for the particular application can take place (e.g., by the identification component and selection component respectively). It can be a trial and error method to reduce the dimensionality of the features to produce an absolutely useful minimum feature set. Getting to this minimum can improve computational time and reduce memory complexity.

After this, a choice component can choose a feature classifier (e.g., a best feature classifier). Example feature classification algorithms can be in groups four and five above. Additionally, non-parametric techniques can be used as classification tasks such as k-nearest neighbor (KNN) or Support Vector Machine (SVM). For example, SVM can employ a discriminative classifier for document categorization. SVM can be used in various domains of data mining such as bioinformatics, image, video, human activity classification, safety and security, being a baseline, etc.

Tree-based classifiers, such as decision tree and random forest, can be employed in document categorization. Additionally, graphical classifications can be employed, such as conditional random fields (CRFs), such as use in document summarization and automatic keyword extraction.

Other areas of AI/ML/DL application can include image classification, NLP, face recognition, etc. The success of these algorithms can rely on their capacity to model complex and non-linear relationships within data. Implementation of more algorithms to test an application can result in better classification before taking a final decision.

An evaluation component can evaluate an application. Understanding how a model performs can be beneficial to the use and development of classification methods (e.g., cybersecurity classification methods). Accuracy calculation can be a method used for evaluation of a balanced data set. Before a final projection, multiple evaluations can be used employing different algorithms.

The ML/DL algorithms/models could be used by many different applications. However, values of the parameters (that is, features) and their usages to interpret the results could be completely different depending on specific applications. The predicted results can be very specific to the respective applications.

In training, known and labeled data of known applications can be used so that the models can predict the actual result for that particular application (e.g., loss parameter exceeded the certain threshold for different kinds of cybersecurity attacks) while in actual real-world application unknown and unlabeled data can be used as the input for prediction. The training data can be useful because prediction can be as good as trained data.

In addition, Causal Inference with Reflection (CI-R)-based ML/DL—Neural Network Platform, can be where there are inference-based solutions performed with detail explanations of computation. CI-R-based ML/DL learning forms, in at least one example, can be Supervised, Unsupervised, or Reinforcement Learning. With this, Causal Inference with Refection (CI-R)-based ML/DL algorithms can be employed.

Figure 8:
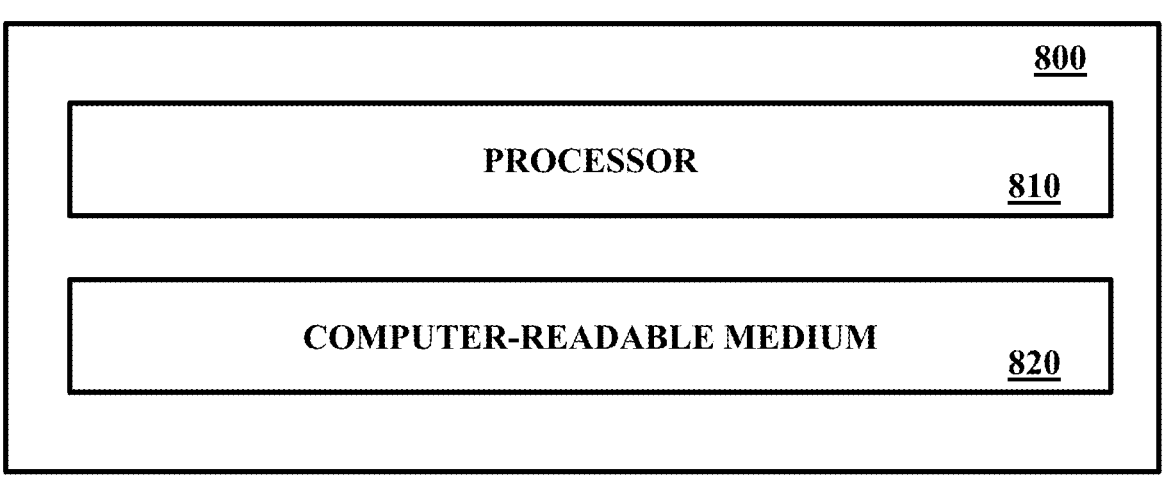
FIG. 8 illustrates one embodiment of a system comprising a processor and a computer-readable medium.

FIG. 8 illustrates one embodiment of a system 800 comprising a processor 810 (e.g., natural language processor) and a computer-readable medium 820 (e.g., non-transitory computer-readable medium). In one embodiment, the computer-readable medium 820 is communicatively coupled to the processor 810 and stores a command set executable by the processor 810 to facilitate operation of at least one component disclosed herein (e.g., the feature extraction component, the feature classification component, etc.).

In one embodiment, at least one component disclosed herein (e.g., the signal cleaning component) can be implemented, at least in part, by way of non-software, such as implemented as hardware by way of the system 800. Two example components that can be implemented at least in part by way of non-software, such as software stored on the hardware of the computer-readable medium 820 and capable of being executed by the processor 810, are an identification component and an enablement component. The identification component can be configured to identify a capability of a device (e.g., a capability not AI/ML/DL-enabled nor network-enabled). The enablement component can be configured to cause the capability to be artificial intelligence (AI)-enabled, machine learning (ML)-enabled, deep learning (DL)-enabled, and network-enabled.

In one embodiment, the computer-readable medium 820 retains the database 710 of FIG. 7. In one embodiment, the processor 810 and the computer-readable medium 820 functions as AI/ML/DL embedded hardware. In one embodiment, the computer-readable medium 820 is configured to store processor-executable instructions that when executed by the processor 810, cause the processor 810 to perform at least part of a method disclosed herein (e.g., at least part of one of the methods 900-1000 discussed below and/or the method 400 of FIG. 4) and implement operation related to the process flow discussed below.

Figure 9:
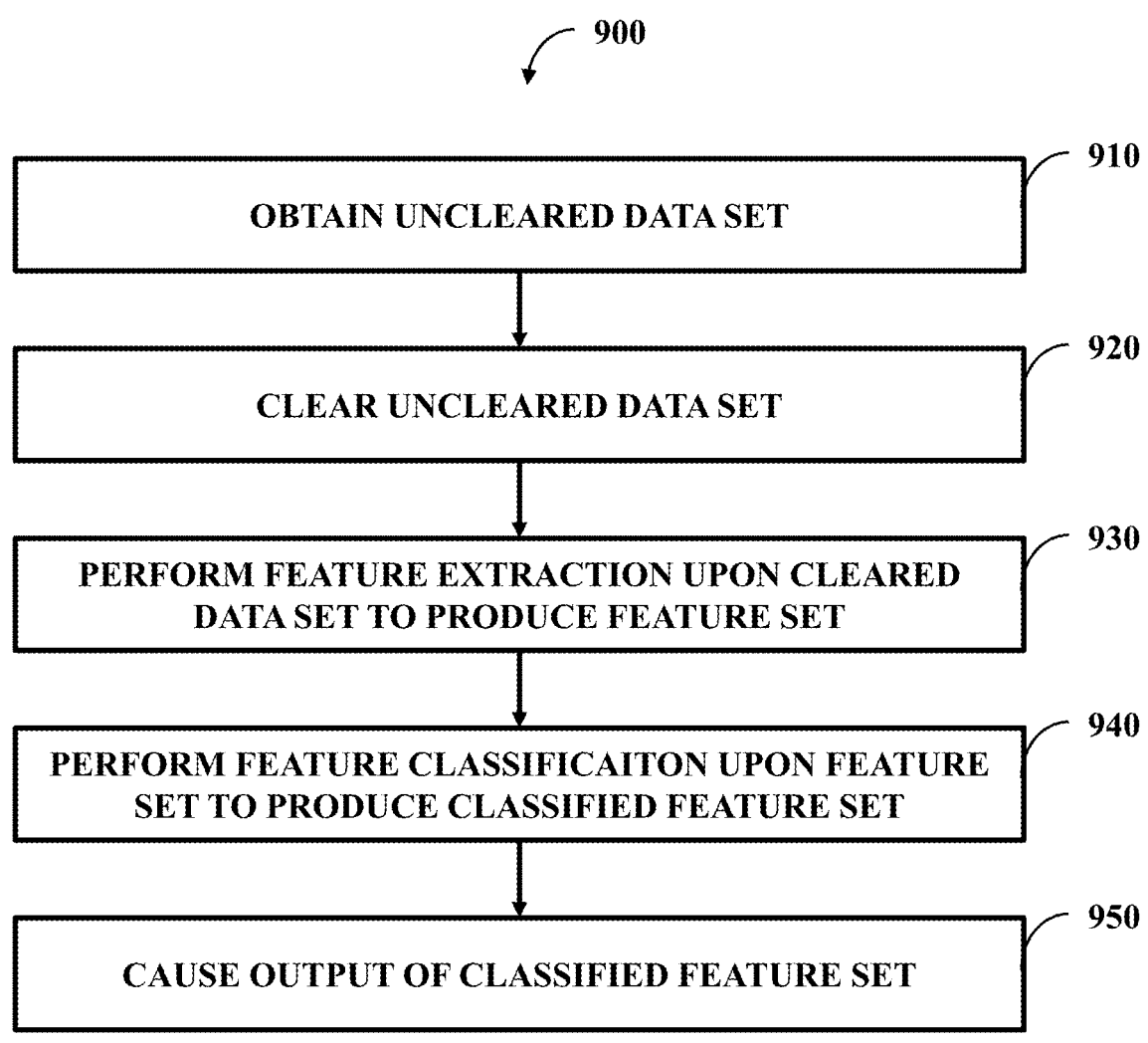
FIG. 9 illustrates one embodiment of a method comprising five actions.

FIG. 9 illustrates one embodiment of a method 900 comprising five actions 910-950. At 910, obtaining an uncleared data set can occur. In one embodiment, this comprises receiving a sensor signal, processing the sensor signal into a convertible form, and digitizing the sensor signal in the convertible form into the uncleared data set.

At 920, clearing the uncleared data set to produce a cleared data set can take place. This can comprise identifying a definition of noise that is based, at least in part, on the feature set and filtering out the noise from the uncleared data set, the noise comprises a non-feature data entry.

At 930, performing feature extraction upon the cleared data set to produce a feature set can occur. In one embodiment, this can comprise identifying an output application destination for the classified feature set, selecting an algorithm set based on the output application destination, and applying the algorithm set on the cleared data set, the output of the algorithm set being the feature set. In one embodiment, this can comprise identifying an output application destination for the classified feature set, selecting a feature algorithm set based on the output application destination, applying the feature algorithm set on the cleared data set to produce a potential feature set, and applying a dimensionality reduction algorithm set on the potential feature set, the output of the dimensionality reduction algorithm set being the feature set.

At 940, performing feature classification upon the feature set to produce a classified feature set can take place. This can comprise applying an ML and/or DL algorithm upon the feature set. At 950, causing output of the classified feature set can occur.

FIG. 10 illustrates one embodiment of a method 1000 comprising seven actions 910-950 and 1010-1020. At 1010, employing the classified feature set, after being outputted at

950, in a predictive test can occur to produce a predictive test result. At 1020, there can be causing output of the predictive test result.

What is claimed is:

1. A method, comprising:
receiving a sensor signal;
processing the sensor signal into a convertible form;
digitizing the sensor signal in the convertible form into an uncleared data set;
clearing the uncleared data set to produce a cleared data set;
performing feature extraction upon the cleared data set to produce a feature set through application of a dimensionality reduction algorithm;
performing feature classification upon the feature set to produce a classified feature set; and
causing output of the classified feature set.

2. A method, comprising:
obtaining an uncleared data set;
clearing the uncleared data set to produce a cleared data set;
performing feature extraction upon the cleared data set to produce a feature set;
performing feature classification upon the feature set to produce a classified feature set; and
causing output of the classified feature set,
where performing feature extraction upon the cleared data set to produce the classified feature set comprises identifying an output application destination for the classified feature set, selecting a feature algorithm set based on the output application destination, applying the feature algorithm set on the cleared data set to produce a potential feature set, and applying a dimensionality reduction algorithm set on the potential feature set with the output of the dimensionality reduction algorithm set being the feature set a definition of noise that is based, at least in part, on the feature set and filtering out the noise from the uncleared data set, the noise comprises a non-feature data entry.

3. A method, comprising:
obtaining an uncleared data set;
clearing the uncleared data set to produce a cleared data set;
performing feature extraction upon the cleared data set to produce a feature set by identifying an output application destination for the classified feature set, selecting an algorithm set based on the output application destination, and applying the algorithm set on the cleared data set, the output of the algorithm set being the feature set, where the algorithm set is a dimensionality reduction algorithm set;
performing feature classification upon the feature set to produce a classified feature set; and
causing output of the classified feature set.

4. The method of claim 1, comprising:
employing the classified feature set, after being outputted, in a predictive test to produce a predictive test result; and
causing output of the predictive test result.

5. The method of claim 4, where performing feature classification upon the feature set to produce a classified feature set comprises:
applying a machine learning algorithm upon the feature set.

6. The method of claim 4, where performing feature classification upon the feature set to produce a classified feature set comprises:

applying a deep learning algorithm upon the feature set.

7. The method of claim 2, where obtaining the uncleared data set comprises:

receiving a sensor signal;

processing the sensor signal into a convertible form; and digitizing the sensor signal in the convertible form into the uncleared data set.

8. The method of claim 7, comprising:

employing the classified feature set, after being outputted, in a predictive test to produce a predictive test result; and causing output of the predictive test result.

9. The method of claim 8, where performing feature classification upon the feature set to produce a classified feature set comprises:

applying a machine learning algorithm upon the feature set.

10. The method of claim 8, where performing feature classification upon the feature set to produce a classified feature set comprises:

applying a deep learning algorithm upon the feature set.

11. The method of claim 3, where obtaining the uncleared data set comprises:

receiving a sensor signal;

processing the sensor signal into a convertible form; and digitizing the sensor signal in the convertible form into the uncleared data set.

12. The method of claim 8, comprising:

employing the classified feature set, after being outputted, in a predictive test to produce a predictive test result; and causing output of the predictive test result.

13. The method of claim 9, where performing feature classification upon the feature set to produce a classified feature set comprises:

applying a machine learning algorithm upon the feature set.

14. The method of claim 9, where performing feature classification upon the feature set to produce a classified feature set comprises:

applying a deep learning algorithm upon the feature set.

15. The method of claim 3, comprising:

employing the classified feature set, after being outputted, in a predictive test to produce a predictive test result; and causing output of the predictive test result.

16. The method of claim 2, comprising:

employing the classified feature set, after being outputted, in a predictive test to produce a predictive test result; and causing output of the predictive test result.

* * * * *